(12) United States Patent
Fuwa

(10) Patent No.: US 8,038,148 B2
(45) Date of Patent: Oct. 18, 2011

(54) MEANDER CONTROL SYSTEM, AND MEANDER CONTROL METHOD

(75) Inventor: Toshio Fuwa, Nisshin (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 205 days.

(21) Appl. No.: 12/435,520

(22) Filed: May 5, 2009

(65) Prior Publication Data

US 2009/0278303 A1 Nov. 12, 2009

(30) Foreign Application Priority Data

May 9, 2008 (JP) ................................ 2008-123822

(51) Int. Cl.
*B65H 7/02* (2006.01)
(52) U.S. Cl. .......................................... 271/227; 226/21
(58) Field of Classification Search .................. 271/227, 271/228; 226/3, 15, 18, 20, 21
See application file for complete search history.

(56) References Cited

U.S. PATENT DOCUMENTS

| 5,691,908 | A | * | 11/1997 | Adamy ........................ 700/122 |
| 5,711,470 | A | * | 1/1998 | Thompson ..................... 226/4 |
| 6,192,955 | B1 | * | 2/2001 | Rice ............................ 156/351 |
| 2008/0136094 | A1 | * | 6/2008 | Elliot ........................... 271/270 |
| 2010/0072244 | A1 | * | 3/2010 | Chuang et al. ................. 226/19 |
| 2011/0042437 | A1 | * | 2/2011 | Sugie et al. ..................... 226/3 |

FOREIGN PATENT DOCUMENTS

| JP | 62-031650 A | | 2/1987 |
| JP | 62-164562 U | | 10/1987 |
| JP | 01-72906 U | | 5/1989 |
| JP | 05-039527 A | | 2/1993 |
| JP | 05-208763 A | | 8/1993 |
| JP | 05208763 A | * | 8/1993 |
| JP | 07-309490 A | | 11/1995 |

* cited by examiner

*Primary Examiner* — Jeremy R Severson
(74) *Attorney, Agent, or Firm* — Kenyon & Kenyon LLP

(57) ABSTRACT

A meander control is performed by using: a guide roller that alters the conveying direction of a aluminum sheet conveyed along a conveying path; a first edge sensor that detects the amount of meandering at a first detection position that is upstream of the guide roller; a second edge sensor that detects the amount of meandering at a second detection position between the first edge sensor and the guide roller; and a control device that calculates an error contained in a first gain of a first feedforward model on the basis of a detected value from the first edge sensor and a detected value from the second edge sensor, and corrects a second gain of a second feedforward model by the calculated error, and then calculates a guide position-estimated amount of meandering on the basis of the second feedforward model and the detected value from the second edge sensor.

4 Claims, 14 Drawing Sheets

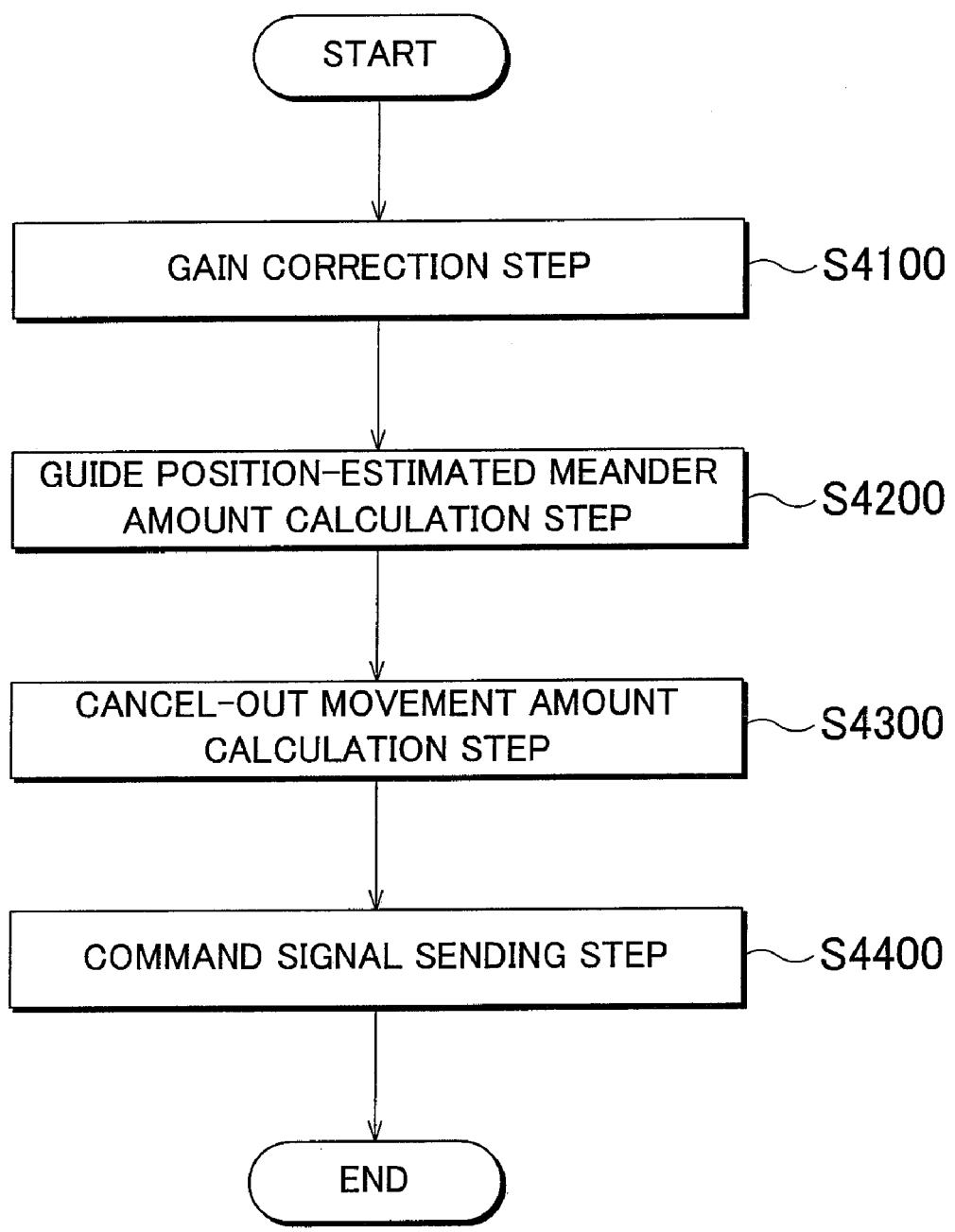

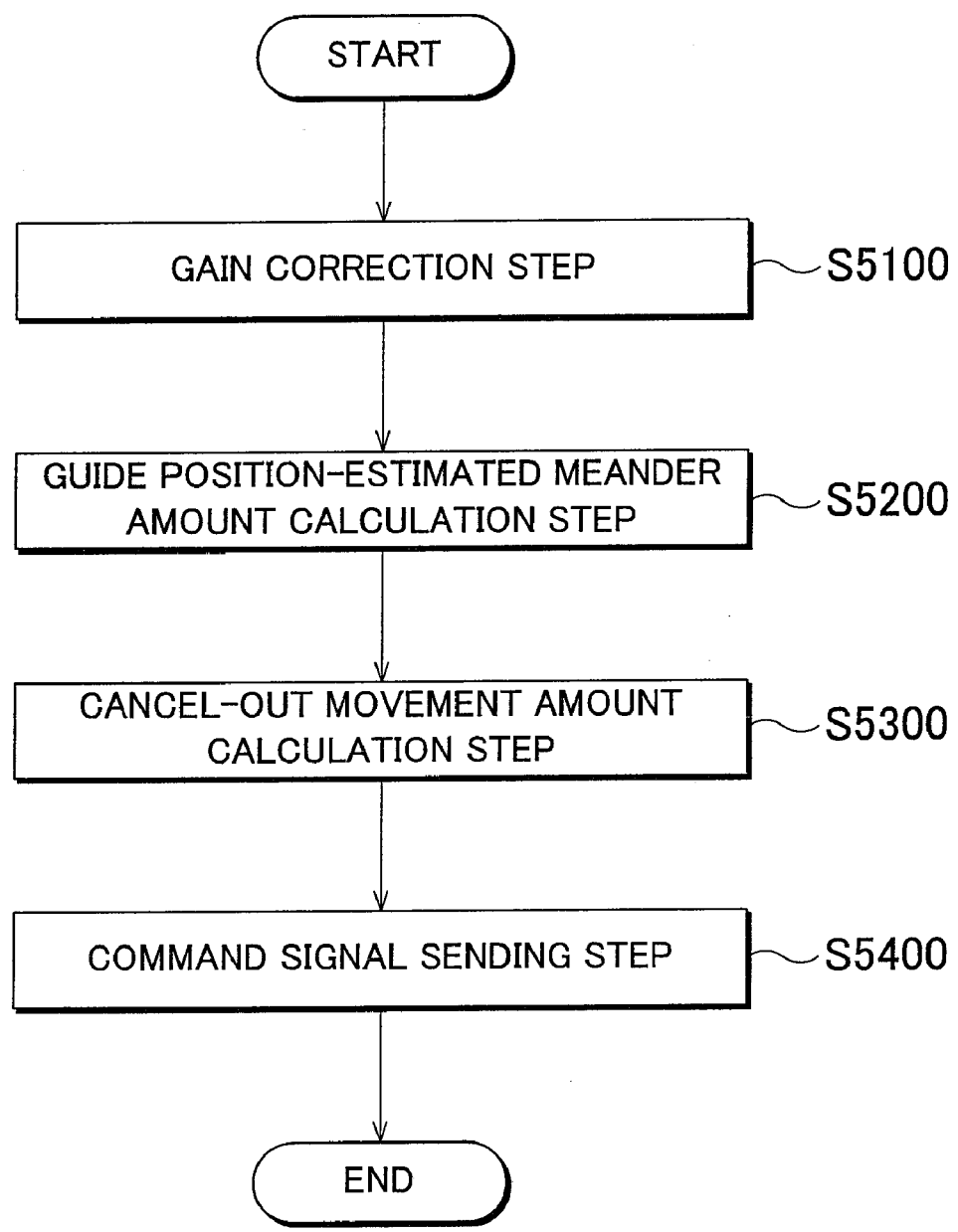

MEANDER CONTROL SYSTEM, AND MEANDER CONTROL METHOD

INCORPORATION BY REFERENCE

The disclosure of Japanese Patent Application No. 2008-123822 filed on May 9, 2008 including the specification, drawings and abstract is incorporated herein by reference in its entirety.

BACKGROUND OF THE INVENTION

1. Field of the Invention

The invention relates to a technology that restrains the meandering of a sheet-like object that is conveyed lengthwise along the conveying path.

2. Description of the Related Art

As a production method for a sheet electrode that is a raw material of positive electrodes of lithium-ion secondary cells, there is known a method in which an active material layer is formed by applying a predetermined active material to a sheet surface of a sheet made of aluminum (hereinafter, referred to as "aluminum sheet"), and the density of the active material layer is raised by pressing the aluminum sheet with the active material layer formed thereon, by rollers or the like.

Generally, a production apparatus for such a sheet electrode includes an application device that applies a predetermined active material to a sheet surface of an aluminum sheet, a desiccation device that dries the active material by heating the aluminum sheet on which the predetermined active material has been applied, a press device made up of press rollers which presses the aluminum sheet on which the active material has been applied and dried, and a conveyance device that connects the application device, the desiccation device and the press device and conveys the aluminum sheet. As the conveyance device, there is known a device which includes a driving roller that contacts an aluminum sheet and is rotationally driven, and a driven roller that rotatably contacts the aluminum sheet, and which conveys the aluminum sheet in its longitudinal direction.

Generally, a positive electrode of a lithium-ion secondary cell is produced by applying a predetermined active material to a central portion of a sheet surface of an aluminum sheet that is central in the width direction of the sheet, and forming a "region to which the active material is not applied" in each of two end portions of the sheet surface in the width direction, and then cutting the aluminum sheet at the center thereof in the width direction. During production of the lithium-ion secondary cell, a wiring for electrification is welded to the "region to which the active material is not applied". In order to secure a certain quality of the lithium-ion secondary cells that employ positive electrodes produced as described above, it is necessary to accurately control the width of the "region to which the active material is not applied" formed on a sheet surface of an aluminum sheet that is to be made into positive electrodes. Then, in order to accurately control the width of the "region to which the active material is not applied", the deviation of the aluminum sheet during the conveyance thereof by a conveyance device, the meandering of the aluminum sheet, must be restrained.

Besides, from the viewpoint of improving the production efficiency of lithium-ion secondary cells and thus cutting back the production cost of lithium-ion secondary cells, it is important to raise the velocity at which a conveyance device conveys the aluminum sheet.

However, in general, the conveying velocity of a sheet-like object, such as the foregoing aluminum sheet or the like, and the meandering of the sheet-like object are in a trade-off relation; that is, if the conveying velocity of the sheet-like object rises, the meandering of the sheet-like object tends to become conspicuous.

A known method for restraining the meandering of a sheet-like object is a method that uses a meander control device that includes a guide roll that is provided on an intermediate portion of a conveying path of a sheet-like object, and that contacts the sheet-like object, and alters (corrects) the conveying direction of the sheet-like object by turning about an axis perpendicular to the sheet surface of the sheet-like object conveyed along the conveying path, an edge sensor that is disposed on the conveying path at a downstream side of the guide roll, and that detects the position of the sheet-like object in the width direction and therefore the amount of meandering of the sheet-like object, and a control device that feedback-controls the amount of turn (angle of turn) of the guide roll on the basis of the amount of meandering of the sheet-like object that is detected by the edge sensor.

However, in the foregoing method of feedback-controlling the amount of turn of the guide roll, since the edge sensor is disposed at the downstream side of the guide roll, and corrects the meandering of the sheet-like object subsequently to occurrence thereof, the method leads to an event as follows. That is, particularly in the case where the amount of meandering of the sheet-like object sharply increases or decreases under a condition that the conveying velocity of the sheet-like object is great, if the gain of the control device is made large, the meandering of the sheet-like object is rather promoted; on the other hand, if the gain of the control device is made small, the meandering of the sheet-like object (deviation of the sheet-like object from a position through which the sheet-like object is required to pass in the conveying path) cannot be eliminated. Thus, in the case where the conveying velocity of the sheet-like object is great, there arises a problem of the meandering of the sheet-like object being unable to be restrained merely by feedback-controlling the amount of turn of the guide roll.

A known method for solving this problem of the feedback control is a method in which an edge sensor is disposed at an upstream side of the guide roll along the conveying path, and the amount of turn of the guide roll is feedforward-controlled on the basis of the amount of meandering of the sheet-like object detected by the edge sensor. An example of this method is described in Japanese Patent Application Publication No. 5-39527 (JP-A-5-39527).

Generally, the method of feedforward-controlling the amount of turn of the guide roll calculates an estimated value of the amount of meandering of the sheet-like object at a position of contact with the guide roll (guide position) (hereinafter, the estimated value will be referred to as "guide position-estimated amount of meandering"), and controls the amount of turn of the guide roll so as to cancel out the calculated "guide position-estimated amount of meandering".

However, the foregoing method of feedforward-controlling the amount of turn of the guide roll has a construction in which coefficients, constants and other parameters used in the calculation expression for calculating the "guide position-estimated amount of meandering" are set beforehand as fixed values on the basis of experiments or theoretical values. Therefore, in the case where the conveying condition of the sheet-like object changes due to an external disturbance factor, and the feedforward control is performed in a conveying condition that has deviated from the conveying condition set at the time of setting the foregoing parameters, the accuracy of the calculated "guide position-estimated amount of meandering" declines.

An example of the foregoing external disturbance factor is a change of the friction force (friction coefficient) between a group of rollers that constitute the conveyance device and the sheet surface of the sheet-like object. The friction force between the group of rollers constituting the conveyance device and the sheet surface of the sheet-like object can change in various cases, including: (1) the case where the conveying velocity or tension of the sheet-like object changes, for example, when the conveyance device starts conveying the sheet-like object, or stops conveying; (2) the case where the tension of the sheet-like object changes because of, for example, malfunction of the dancer rolls that control the tension, or the like; (3) the case where the surface roughness of surfaces of rollers constituting the conveyance device changes because of, for example, abrasion of the surfaces of the rollers, or the like; (4) the case where the thickness of the sheet-like object being conveyed, or the length thereof in the width direction or the longitudinal direction changes (e.g., in the case of a positive electrode of a lithium-ion secondary cell, the effective thickness thereof increases when an active material is applied to the sheet surface. Or, when the sheet-like object is heated and cooled in order to dry the active material applied thereon, the sheet-like object expands and shrinks, thus changing its length in the longitudinal direction); (5) the case where there are variations in the surface roughness or thickness of sheet-like objects between lots; etc. Thus, in order to effectively restrain the meandering of the sheet-like object by the related-art feedforward control, there is a need to perform, as a prerequisite condition, a strict process management so as to exclude the foregoing external disturbance factor, thus giving rise to a problem of it being difficult to apply this requirement to actual operation.

SUMMARY OF THE INVENTION

The invention has been accomplished in light of the foregoing circumstances, and provides a meander control system and a meander control method capable of effectively restraining the meandering of a sheet-like object even in the case where the conveying condition of the sheet-like object changes.

According to one aspect of the invention, there is provided a meander control system that includes: a guide roller that is disposed on an intermediate portion of a conveying path of a sheet-like object, and that alters conveying direction of the sheet-like object by moving in contact with the sheet-like object conveyed along the conveying path; a first meander amount sensor which is disposed at a first detection position that is at an upstream side of the guide roller along the conveying path, and which detects amount of meandering of the sheet-like object at the first detection position; a second meander amount sensor that is disposed at a second detection position between the first meander amount sensor and the guide roller on the conveying path, and that detects the amount of meandering of the sheet-like object at the second detection position; and a control device that calculates an error contained in a first gain of a first feedforward model in which the amount of meandering of the sheet-like object at the second detection position is estimated based on the amount of meandering of the sheet-like object at the first detection position, based on a detected value from the first meander amount sensor and a detected value from the second meander amount sensor, and corrects by the error a second gain of a second feedforward model in which the amount of meandering of the sheet-like object at a guide position that is a position at which the sheet-like object contacts the guide roller is estimated based on the amount of meandering of the sheet-like object at the second detection position, and calculates a guide position-estimated amount of meandering that is an estimated value of the amount of meandering of the sheet-like object at the guide position based on the second feedforward model that employs the second gain corrected by the error, and on the detected value from the second meander amount sensor, and calculates an amount of cancel-out movement based on the guide position-estimated amount of meandering, and a pre-set relation between the amount of meandering of the sheet-like object at the guide position and the amount of cancel-out movement that is an amount of movement of the guide roller for cancelling out the amount of meandering at the guide position, and sends to the guide roller a command signal for causing the guide roller to move by the amount of cancel-out movement calculated.

According to another aspect of the invention, there is provided a meander control system that includes: a guide roller that is disposed on an intermediate portion of a conveying path of a sheet-like object, and that alters conveying direction of the sheet-like object by moving in contact with the sheet-like object conveyed along the conveying path; a first meander amount sensor which is disposed at a first detection position that is at an upstream side of the guide roller along the conveying path, and which detects amount of meandering of the sheet-like object at the first detection position; a second meander amount sensor that is disposed at a second detection position between the first meander amount sensor and the guide roller on the conveying path, and that detects the amount of meandering of the sheet-like object at the second detection position; and a third meander amount sensor which is disposed at a third detection position that is at a downstream side of the guide roller along the conveying path, and which detects the amount of meandering of the sheet-like object at the third detection position; and a control device that calculates an error contained in a first gain of a first feedforward model in which the amount of meandering of the sheet-like object at the second detection position is estimated based on the amount of meandering of the sheet-like object at the first detection position, based on a detected value from the first meander amount sensor and a detected value from the second meander amount sensor, and corrects by the error a second gain of a second feedforward model in which the amount of meandering of the sheet-like object at a guide position that is a position at which the sheet-like object contacts the guide roller is estimated based on the amount of meandering of the sheet-like object at the second detection position, and calculates a guide position-estimated amount of meandering that is an estimated value of the amount of meandering of the sheet-like object at the guide position based on the second feedforward model that employs the second gain corrected by the error, and on the detected value from the second meander amount sensor, and calculates a feedforward-side amount of cancel-out movement based on the guide position-estimated amount of meandering, and a pre-set relation between the amount of meandering of the sheet-like object at the guide position and the feedforward-side amount of cancel-out movement that is an amount of movement of the guide roller for cancelling out the amount of meandering at the guide position, and calculates a feedback-side amount of cancel-out movement based on the detected value from the third meander amount sensor, and a pre-set relation between the amount of meandering of the sheet-like object at the third detection position and the feedback-side amount of cancel-out movement that is an amount of movement of the guide roller for cancelling out the amount of meandering at the third detection position, and calculates a sum of the calculated feedforward-side amount of cancel-out movement and the calculated feedback-side amount of cancel-out movement, and sets the sum as the amount of cancel-out movement, and sends to the guide roller a command signal for causing the guide roller to move by the amount of cancel-out movement.

According to still another aspect of the invention, there is provided a meander control system that includes: a guide roller that is disposed on an intermediate portion of a conveying path of a sheet-like object, and that alters conveying direction of the sheet-like object by moving in contact with the sheet-like object conveyed along the conveying path; a meander amount sensor which is disposed at a detection position that is at an upstream side of the guide roller along the conveying path, and which detects amount of meandering of the sheet-like object at the first detection position; a velocity sensor that detects a conveying velocity of the sheet-like object conveyed along the conveying path; and a control device that corrects a time constant contained in a gain of a feedforward model in which the amount of meandering of the sheet-like object at a guide position that is a position at which the sheet-like object contacts the guide roller is estimated based on the amount of meandering of the sheet-like object at the detection position, based on the detected value from the velocity sensor, and calculates a guide position-estimated amount of meandering that is an estimated value of the amount of meandering of the sheet-like object at the guide position based on the feedforward model that employs the corrected gain, and on the detected value from the meander amount sensor, and calculates an amount of cancel-out movement based on the guide position-estimated amount of meandering, and a pre-set relation between the amount of meandering of the sheet-like object at the guide position and the amount of cancel-out movement that is an amount of movement of the guide roller for cancelling out the amount of meandering at the guide position, and sends to the guide roller a command signal for causing the guide roller to move by the amount of cancel-out movement.

According to a further aspect of the invention, there is provided a meander control system that includes: a guide roller that is disposed on an intermediate portion of a conveying path of a sheet-like object, and that alters conveying direction of the sheet-like object by moving in contact with the sheet-like object conveyed along the conveying path; a meander amount sensor which is disposed at a detection position that is at an upstream side of the guide roller along the conveying path, and which detects amount of meandering of the sheet-like object at the first detection position; a velocity sensor that detects a conveying velocity of the sheet-like object conveyed along the conveying path; a tension sensor that detects tension of the sheet-like object along the conveying path; a control device that corrects a time constant contained in a gain of a feedforward model in which the amount of meandering of the sheet-like object at a guide position that is a position at which the sheet-like object contacts the guide roller is estimated based on the amount of meandering of the sheet-like object at the detection position, based on the detected value from the velocity sensor and the detected value from the tension sensor, and calculates a guide position-estimated amount of meandering that is an estimated value of the amount of meandering of the sheet-like object at the guide position based on the feedforward model that employs the corrected gain, and on the detected value from the meander amount sensor, and calculates an amount of cancel-out movement based on the guide position-estimated amount of meandering, and a pre-set relation between the amount of meandering of the sheet-like object at the guide position and the amount of cancel-out movement that is an amount of movement of the guide roller for cancelling out the amount of meandering at the guide position, and sends to the guide roller a command signal for causing the guide roller to move by the amount of cancel-out movement.

According to a yet further aspect of the invention, there is provided a meander control method of controlling amount of meander of a sheet object by using: a guide roller that is disposed on an intermediate portion of a conveying path of a sheet-like object, and that alters conveying direction of the sheet-like object by moving in contact with the sheet-like object conveyed along the conveying path; a first meander amount sensor which is disposed at a first detection position that is at an upstream side of the guide roller along the conveying path, and which detects amount of meandering of the sheet-like object at the first detection position; and a second meander amount sensor that is disposed at a second detection position between the first meander amount sensor and the guide roller on the conveying path, and that detects the amount of meandering of the sheet-like object at the second detection position. The meander amount control includes: an error calculation step of calculating an error contained in a first gain of a first feedforward model in which the amount of meandering of the sheet-like object at the second detection position is estimated based on the amount of meandering of the sheet-like object at the first detection position, based on a detected value from the first meander amount sensor and a detected value from the second meander amount sensor; a gain correction step of correcting by the error a second gain of a second feedforward model in which the amount of meandering of the sheet-like object at a guide position that is a position at which the sheet-like object contacts the guide roller is estimated based on the amount of meandering of the sheet-like object at the second detection position; a guide position-estimated meander amount calculation step of calculating a guide position-estimated amount of meandering that is an estimated value of the amount of meandering of the sheet-like object at the guide position based on the second feedforward model that employs the second gain corrected by the error, and on the detected value from the second meander amount sensor; a cancel-out movement amount calculation step of calculating an amount of cancel-out movement based on the guide position-estimated amount of meandering, and a pre-set relation between the amount of meandering of the sheet-like object at the guide position and the amount of cancel-out movement that is an amount of movement of the guide roller for cancelling out the amount of meandering at the guide position; and a command signal sending step of sending to the guide roller a command signal for causing the guide roller to move by the amount of cancel-out movement calculated.

According to a further aspect of the invention, there is provided a meander control method that controls amount of meandering of a sheet-like object conveyed along a conveying path, by using: a guide roller that is disposed on an intermediate portion of the conveying path of the sheet-like object, and that alters conveying direction of the sheet-like object by moving in contact with the sheet-like object conveyed along the conveying path; a first meander amount sensor that is disposed at a first detection position that is at an upstream side of the guide roller along the conveying path, and that detects the amount of meandering of the sheet-like object at the first detection position; a second meander amount sensor that is disposed at a second detection position between the first meander amount sensor and the guide roller on the conveying path, and that detects the amount of meandering of the sheet-like object at the second detection position; and a third meander amount sensor that is disposed at a third detection position that is at a downstream side of the guide roller along the conveying path, and that detects the amount of meandering of the sheet-like object at the third detection position. The meander control method includes: an error calculation step of calculating an error contained in a first gain of a first feedforward model in which the amount of meandering of the sheet-like object at the second detection position is estimated based on the amount of meandering of the sheet-like object at the first detection position, based on a detected value from the first meander amount sensor and a detected value from the second meander amount sensor; a gain correction step of correcting, by the error, a second gain of a second feedforward model in which the amount of meandering of the sheet-like object at a guide position at which the sheet-like object contacts the guide roller is estimated based on the amount of meandering of the sheet-like object at the second detection position; a guide position-estimated meander amount calculation step of calculating a guide position-estimated amount of meandering that is an estimated value of the amount of meandering of the sheet-like object at the guide position, based on the second feedforward model that employs the second gain corrected by the error, and also based on the detected value from the second meander amount sensor; a feedforward-side cancel-out movement amount calculation step of calculating a feedforward-side amount of cancel-out movement based on the guide position-estimated amount of meandering, and a pre-set relation between the amount of meandering of the sheet-like object at the guide position and the feedforward-side amount of cancel-out movement that is an amount of movement of the guide roller for cancelling out the amount of meandering at the guide position; a feedback-side cancel-out movement amount calculation step of calculating a feedback-side amount of cancel-out movement based on the detected value from the third meander amount sensor, and a pre-set relation between the amount of meandering of the sheet-like object at the third detection position and the feedback-side amount of cancel-out movement that is an amount of movement of the guide roller for cancelling out the amount of meandering at the third detection position; a cancel-out movement amount calculation step of calculating a sum of the feedforward-side amount of cancel-out movement and the feedback-side amount of cancel-out movement, and setting the sum as the amount of cancel-out movement; and a command signal sending step of sending to the guide roller a command signal for causing the guide roller to move by the calculated amount of cancel-out movement.

According to a further aspect of the invention, there is provided a meander control method that controls amount of meandering of a sheet-like object conveyed along a conveying path, by using: a guide roller that is disposed on an intermediate portion of the conveying path of the sheet-like object, and that alters conveying direction of the sheet-like object by moving in contact with the sheet-like object that is conveyed along the conveying path; a meander amount sensor that is disposed at a detection position that is at an upstream side of the guide roller along the conveying path, and that detects the amount of meandering of the sheet-like object at the detection position; and a velocity sensor that detects the conveying velocity of the sheet-like object conveyed along the conveying path. The meander control method includes: a gain correction step of correcting a time constant contained in a gain of a feedforward model in which the amount of meandering of the sheet-like object at a guide position at which the sheet-like object contacts the guide roller is estimated based on the amount of meandering of the sheet-like object at the detection position, based on a detected value from the velocity sensor; a guide position-estimated meander amount calculation step of calculating a guide position-estimated amount of meandering that is an estimated value of the amount of meandering of the sheet-like object at the guide position based on the feedforward model that employs the corrected gain, and a detected value from the meander amount sensor; a cancel-out movement amount calculation step of calculating an amount of cancel-out movement based on the guide position-estimated amount of meandering, and a pre-set relation between the amount of meandering of the sheet-like object at the guide position and the amount of cancel-out movement that is an amount of movement of the guide roller for cancelling out the amount of meandering at the guide position; and a command signal sending step of sending to the guide roller a command signal for causing the guide roller to move by the amount of cancel-out movement.

According to a further aspect of the invention, there is provided a meander control method that controls amount of meandering of a sheet-like object conveyed along a conveying path, by using: a guide roller that is disposed on an intermediate portion of the conveying path of the sheet-like object, and that alters conveying direction of the sheet-like object by moving in contact with the sheet-like object conveyed along the conveying path; a meander amount sensor that is disposed at a detection position that is at an upstream side of the guide roller along the conveying path, and that detects the amount of meandering of the sheet-like object at the detection position; a velocity sensor that detects conveying velocity of the sheet-like object conveyed along the conveying path; and a tension sensor that detects tension of the sheet-like object conveyed along the conveying path. The meander control method includes: a gain correction step of correcting a time constant contained in a gain of a feedforward model in which the amount of meandering of the sheet-like object at a guide position at which the sheet-like object contacts the guide roller is estimated based on the amount of meandering of the sheet-like object at the detection position, based on a detected value from the velocity sensor and a detected value from the tension sensor; a guide position-estimated meander amount calculation step of calculating a guide position-estimated amount of meandering that is an estimated value of the amount of meandering of the sheet-like object at the guide position, based on the feedforward model that employs the corrected gain, and a detected value from the meander amount sensor; a cancel-out movement amount calculation step of calculating an amount of cancel-out movement based on the calculated guide position-estimated amount of meandering, and a pre-set relation between the amount of meandering of the sheet-like object at the guide position and the amount of cancel-out movement that is an amount of movement of the guide roller for cancelling out the amount of meandering at the guide position; and a command signal sending step of sending to the guide roller a command signal for causing the guide roller to move by the calculated amount of cancel-out movement.

This invention achieves an effect of being able to effectively restrain the meandering of a sheet-like object even in the case where the conveying condition of the sheet-like object changes.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein:

FIG. 9 is a flowchart showing a fourth embodiment of the meander control method in accordance with the invention;

FIG. 12 is a flowchart showing a fifth embodiment of the meander control method in accordance with the invention;

DETAILED DESCRIPTION OF EMBODIMENTS

Figure 1:
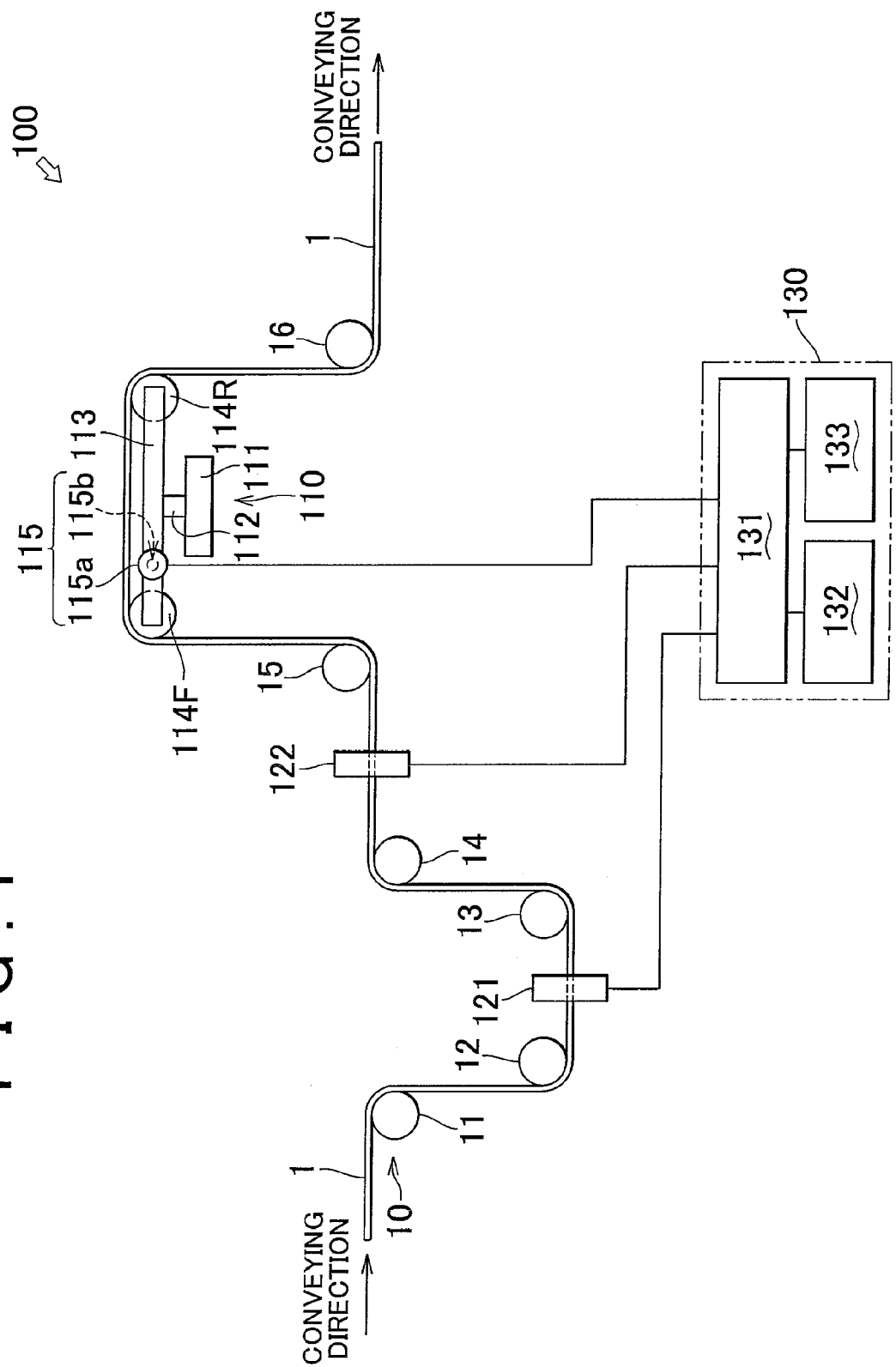
FIG. 1 is a diagram showing a first embodiment of a meander control system in accordance with the invention.
Figure 2:
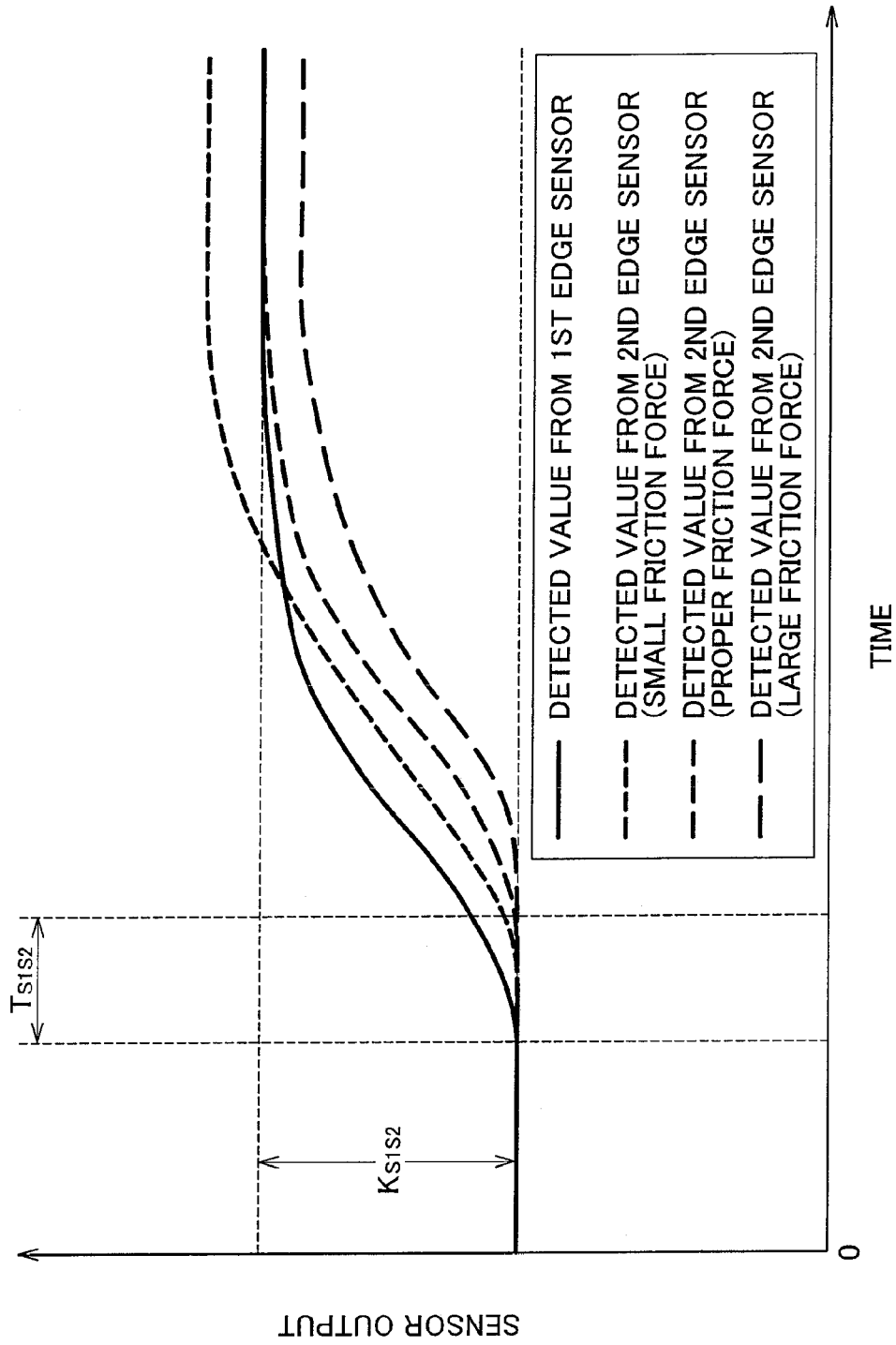
FIG. 2 is a diagram showing a relation between the detected values from a first edge sensor and a second edge sensor and the friction force between rollers and the aluminum sheet.
Figure 3:
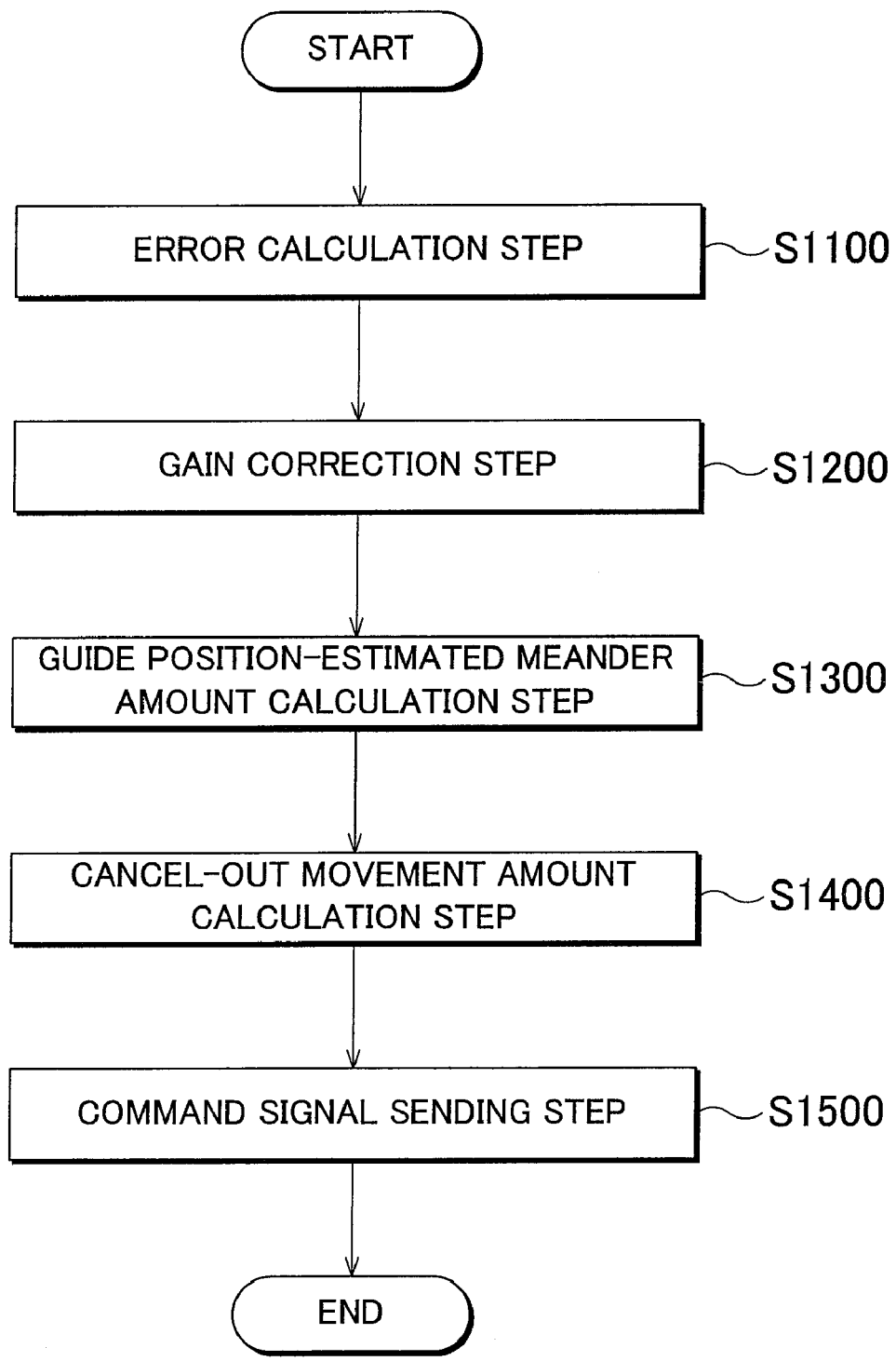
FIG. 3 is a flowchart showing a first embodiment of a meander control method in accordance with the invention.

A meander control system 100 as a first embodiment of a meander control system in accordance with the invention will be described with reference to FIG. 1 to FIG. 3. As shown in FIG. 1, the meander control system 100 controls the meandering of an aluminum sheet 1 that is conveyed by a conveyance device 10, and mainly includes a guide roller 110, a first edge sensor 121, a second edge sensor 122, and a control unit 130. Incidentally, the restraint of the meandering (meander control) of the aluminum sheet 1 by the meander control system 100 corresponds to a first embodiment of a meander control method in accordance with the invention.

The aluminum sheet 1 is an embodiment of a sheet-like object in accordance with the invention, and is a sheet-like object of aluminum (aluminum foil) that is used as a raw material of positive electrodes of lithium-ion secondary cells. The "sheet-like object" is not limited to the aluminum sheet 1 in this embodiment, but includes a wide variety of articles and the like having a shape that is smaller in thickness than in length and width. Examples of the sheet-like object include foils made of a metal material (gold, silver, copper, a steel material, aluminum, titanium, etc.), metal-made or rubber-made sheets, paper, cloth, composite materials combining these sheet materials, etc.).

The conveyance device 10 forms a "conveying path of the aluminum sheet 1", and is a device that forms a portion of a positive electrode production apparatus (not shown) that produces positive electrodes of lithium-ion secondary cells, and conveys the aluminum sheet 1 in its longitudinal direction, connecting between an application device (a device that applies an active material to a sheet surface of the aluminum sheet 1), a desiccation device (a device that dries the active material by heating the aluminum sheet 1 with the active material applied on the sheet surface), a press device (a device that presses the aluminum sheet 1 on which the active material has been applied and dried) which constitute the positive electrode production apparatus. The conveyance device 10 in this embodiment includes rollers 11, 12, 13, 14, 15, 16 . . . , and the like. The aluminum sheet 1 contacts the rollers 11, 12, 13, 14, 15, 16 . . . , and is conveyed from an upstream side to a downstream side on the conveying path.

The guide roller 110 is an embodiment of a guide roller in accordance with the invention, and alters the conveying direction of the aluminum sheet 1 that is conveyed along "the conveying path of the aluminum sheet 1". The guide roller 110 is disposed on an intermediate portion of the conveying path of the aluminum sheet 1 and, more specifically, at a position between the roller 15 and the roller 16. The guide roller 110 mainly includes a base 111, a turning shaft 112, a turning frame 113, a front roller 114F, a rear roller 114R, and a hydraulic cylinder 115.

The base 111 is a structural part that forms a lower portion of the guide roller 110, and is fixed to a floor surface, a ground surface, or a stationary structural body (e.g., a frame that constitutes the conveyance device 10), etc.

The turning shaft 112 is a generally cylindrical member. A lower end of the turning shaft 112 is fixed to the base 111.

The turning frame 113 is a structural part that forms an upper portion of the guide roller 110. The turning frame 113 is supported pivotally on an upper end portion of the turning shaft 112 so as to be capable of being rotated (capable of being turned).

The front roller 114F is a generally cylindrical member, and both ends thereof are supported pivotally on an end of the turning frame 113 so as to be capable of being rotated. The front roller 114F contacts the sheet surface of the aluminum sheet 1 that is conveyed by the conveyance device 10, at a position between the roller 15 and the roller 16.

The rear roller 114R is a generally cylindrical member, and both ends thereof are supported pivotally on another end of the turning frame 113 so as to be capable of being rotated. The rear roller 114R contacts the sheet surface of the aluminum sheet 1 conveyed by the conveyance device 10, at a position that is between the roller 15 and the roller 16 and that is at the downstream side of the front roller 114F.

The hydraulic cylinder 115 is an actuator that elongates and contracts by oil pressure. The hydraulic cylinder 115 includes a cylinder main part 115a, and a cylinder rod 115b. The cylinder main part 115a is a generally tubular member that is closed at a first end and is open at a second end. The first end of the cylinder main part 115a is linked to a stationary structural body (not shown) so as to be capable of being rotated. The second end of the cylinder main part 115a is closed by a cap. The cylinder rod 115b is a bar-like member, and is liquid-tightly and slidably supported on the cap that closes the second end of the cylinder main part 115a. A piston is formed on one of two end portions of the cylinder rod 115b which is positioned within the cylinder main part 115a. The piston of the cylinder rod 115b air-tightly and slidably contacts an inner peripheral surface of the cylinder main part 115a. An end portion of the cylinder rod 115b which is positioned outside the cylinder main part 115a is rotatably linked to the turning frame 113.

As the hydraulic cylinder 115 elongates or contracts, the turning frame 113 is turned (rotated) leftward or rightward about the turning shaft 112, so that the conveying direction of the aluminum sheet 1 in contact with the front roller 114F and the rear roller 114R changes. Thus, the guide roller 110 is able to alter the conveying direction of the aluminum sheet 1 in contact with the front roller 114F and the rear roller 114R as the turning frame 113 that pivotably supports the front roller 114F and the rear roller 114R for rotating motion is turned about the turning shaft 112, relative to the base 111.

The first edge sensor 121 is an embodiment of a first meander amount sensor in accordance with the invention, and is a sensor that detects the amount of meandering of the aluminum sheet 1. The "amount of meandering of the aluminum sheet 1" refers to the amount of displacement (amount of deviation) of the aluminum sheet 1 in the width direction from a position (reference position) through which the aluminum sheet 1 is required to pass in the conveying path. The first edge sensor 121 is disposed at a "first detection position" that is a position at the upstream side of the guide roller 110 along the conveying path of the aluminum sheet 1. In this embodiment, the "first detection position" is set at a position between the roller 12 and the roller 13. The first edge sensor 121 in this embodiment includes a light-projecting portion and a light-receiving portion that are disposed on opposite sides of an edge portion of the aluminum sheet 1 (an end portion of the aluminum sheet 1 in the width direction), and detects the position of the edge portion of the aluminum sheet 1 at the "first detection position", and therefore the amount of meandering of the aluminum sheet 1 at the "first detection position" on the basis of the intensity of the light that is projected from the light-projecting portion and received by the light-receiving portion. Incidentally, the first meander amount sensor in accordance with the invention is not limited to a construction that optically detects the position of an end portion of the aluminum sheet 1 in the width direction, like the first edge sensor 121 of this embodiment, but may also be a construction that detects the amount of meandering of the sheet-like object in a different method. Examples of other embodiments of the first meander amount sensor include a construction that detects the position of an end portion of the sheet-like object in the width direction on the basis of a change in capacitance, a CCD camera that takes an image of an end portion of the sheet-like object in the width direction and a construction that estimates the position of the end portion of the sheet-like object in the width direction through a predetermined image processing of an image taken by the CCD camera, a construction that detects the position of an end portion of the sheet-like object by radiating supersonic waves to the end portion of the sheet-like object and detecting the supersonic wave by a microphone, etc. It is desirable to select an appropriate construction according to the characteristics of a sheet-like object that is a detection object, for example, the color (including whether or not it is transparent), the presence/absence of air permeability, the presence/absence of photosensitivity, etc. The first meander amount sensor in accordance with the invention may be a dedicated sensor, but can also be realized through the use of a commercially available sensor.

The second edge sensor 122 is an embodiment of the second meander amount sensor in accordance with the invention, and detects the amount of meandering of the aluminum sheet 1, similarly to the first edge sensor 121. The second edge sensor 122 is disposed at a "second detection position" that is a position that is at the upstream side of the guide roller 110 and at the downstream side of the first edge sensor 121 along the conveying path of the aluminum sheet 1, that is, a position between the first edge sensor 121 and the guide roller 110 on the conveying path of the aluminum sheet 1. In this embodiment, the "second detection position" is set at a position between the roller 14 and the roller 15. The second edge sensor 122 in the embodiment has the same structure as the first edge sensor 121, and a detailed description thereof is omitted.

The control unit 130 includes a control device 131, an input device 132, and a display device 133.

The control device 131 is an embodiment of a control device in accordance with the invention. The control device 131 is able to store various programs and the like, and to expand these programs and the like, and to perform predetermined computations following these programs and the like, and to store results of the computations and the like, and to output the results of the computations and the like to an external device.

The control device 131 may be constructed substantially of a CPU (central processing unit), a ROM (read-only memory), a RAM (random access memory), an HDD (hard disk drive), etc. that are interconnected by a bus, or may also be constructed of a chip of LSI (large scale integrated circuit), or the like. The control device 131 in the embodiment is a dedicated device, but may also be realized by a commercially available device, such as a personal computer, a work station, etc., that appropriately stores programs and the like. Besides, the control device in accordance with the invention may also perform as a control device of a conveyance device that conveys the sheet-like object.

The control device 131 is connected to the first edge sensor 121. The control device 131 is able to acquire the amount of meandering of the aluminum sheet 1 at the first detection position which is detected by the first edge sensor 121, that is, is able to acquire the "detected value of the amount of meandering of the aluminum sheet 1 at the first detection position". The control device 131 is connected to the second edge sensor 122. The control device 131 is able to acquire the amount of meandering of the aluminum sheet 1 at the second detection position which is detected by the second edge sensor 122, that is, the "detected value of the amount of meandering of the aluminum sheet 1 at the second detection position".

The control device 131 is connected to the hydraulic cylinder 115 of the guide roller 110 (more strictly speaking, a switching valve provided on an oil passageway for supplying the working oil to the hydraulic cylinder 115). The control device 131 is able to send a command signal to the hydraulic cylinder 115. The hydraulic cylinder 115 elongates or contracts according to the command signal sent from the control device 131.

The input device 132 is a device that inputs to the control device 131 various pieces of information, instructions, etc., in accordance with the meander control (restraint of meandering) of the aluminum sheet 1 by the meander control system 100, and is therefore connected to the control device 131. The input device 132 in this embodiment is a dedicated device, but may also be a commercially available device, such as a keyboard, a mouse, a pointing device, a button, a switches.

The display device 133 is a device that displays the content input from the input device 132 to the control device 131, the operation status of the meander control system 100, etc., and is connected to the control device 13. Although the display device 133 in this embodiment is a dedicated device, the display device 133 may also be, for example, a commercially available displays, such as a liquid crystal display (LCD), a CRT display (cathode ray tube display), etc.

In the following description, problems of a general feed-forward control will be described in conjunction with the meander control of the aluminum sheet 1 by the related-art meander control system 900 with reference to FIG. 14, prior to detailed description of the meander control of the aluminum sheet 1 performed by the meander control system 100.

Figure 14:
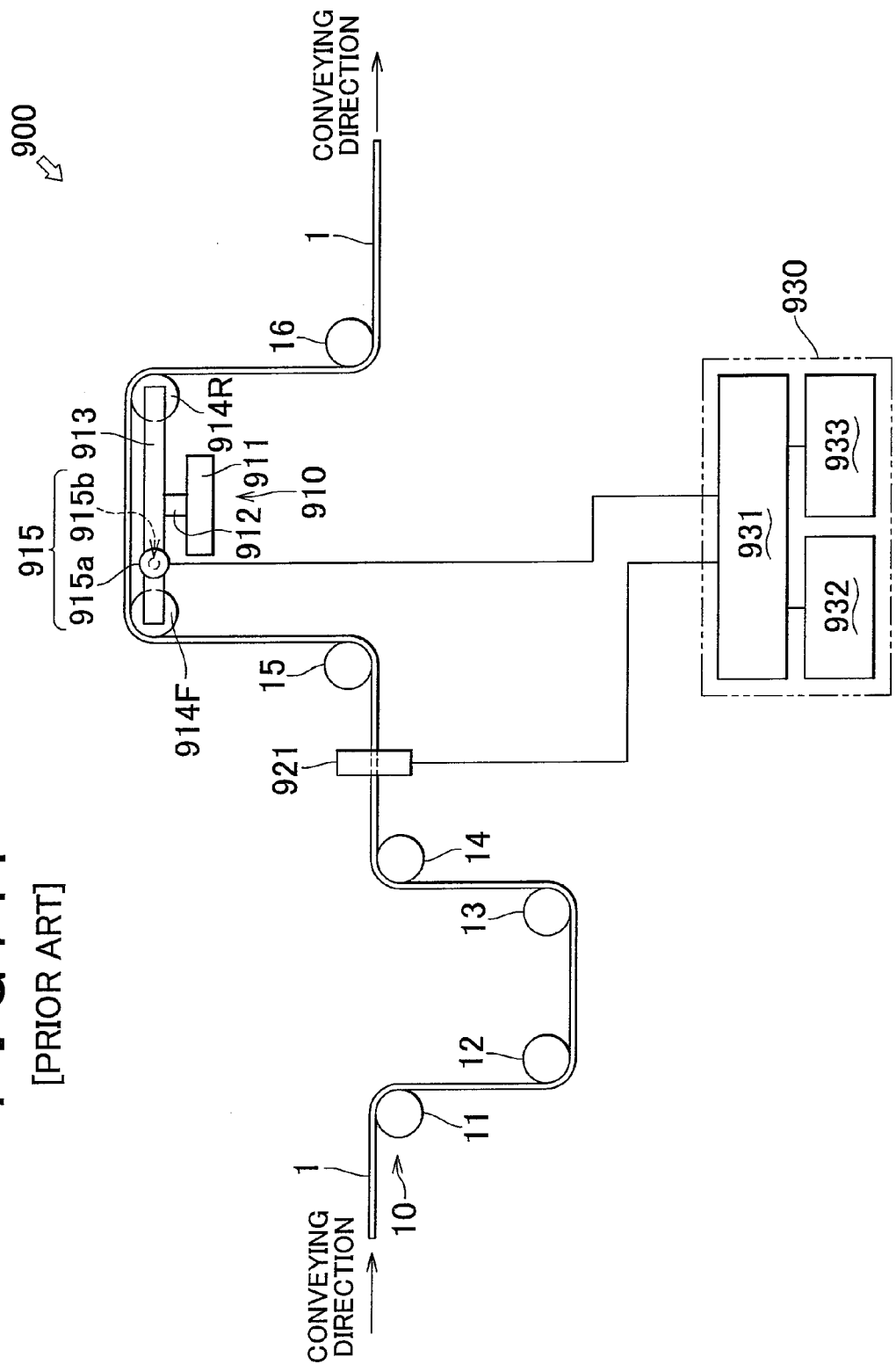
FIG. 14 is a diagram showing a form of carrying out a related-art meander control system.

As shown in FIG. 14, the related-art meander control system 900 controls the meandering of the aluminum sheet 1 that is conveyed by the conveyance device 10, and mainly includes a guide roller 910, an edge sensor 921, and a control unit 930.

The guide roller 910 mainly includes a base 911, a turning shaft 912 a turning frame 913, a front roller 914F, a rear roller 914R, and a hydraulic cylinder 915. The hydraulic cylinder 915 includes a cylinder main part 915a, and a cylinder rod 915b. A basic construction of the guide roller 910 is substantially the same as that of the guide roller 110 shown in FIG. 1, and a detailed description thereof is omitted herein.

The edge sensor 921 detects the amount of meandering of the aluminum sheet 1. The edge sensor 921 is disposed at a position between the roller 14 and the roller 15.

The control unit 930 includes a control device 931, an input device 932, and a display device 933.

The control device 931 is able to store various programs and the like, and to expand these programs and the like, and to perform predetermined computations following these programs and the like, and to store results of the computations and the like, and to output the results of the computations and the like to an external device.

The control device 931 is connected to the edge sensor 921. The control device 931 is able to acquire the amount of meandering of the aluminum sheet 1 detected by the edge sensor 921.

The control device 931 is connected to the hydraulic cylinder 915 of the guide roller 910. The control device 931 is able to send a command signal to the hydraulic cylinder 915. The hydraulic cylinder 915 elongates or contracts in accordance with the command signal sent from the control device 931.

Basic constructions of the input device 932 and the display device 933 are substantially the same as those of the input device 132 and the display device 133 shown in FIG. 1, and detailed descriptions thereof are omitted herein.

The control device 931 determines the amount of movement of the guide roller 910 on the basis of a general concept of the feedforward control shown below. Incidentally, the amount of operation of the guide roller 910 of the amount of movement in the embodiment substantially refers to the amount of elongation/contract of the hydraulic cylinder 915, and therefore the amount of turn (turning angle) of a combined unit of the turning frame 913, the front roller 914F, and the rear roller 914R.

The Laplace function $Y_{GR}(s)$ of the amount of meandering of the aluminum sheet 1 at the position at which the aluminum sheet 1 contacts the guide roller 910, that is, the guide position of the meander control system 900 is expressed as the Laplace arithmetic expression shown in the mathematical expression 11 using a Laplace function $Y_S(s)$ of the amount of meandering of the aluminum sheet 1 at the position at which the edge sensor 921 is disposed, and a time constant $T_{SGR}$ that is calculated by substituting the distance $L_{SGR}$ from the edge sensor 921 to the guide roller 910 along the conveying path of the aluminum sheet 1, and the conveying velocity V of the aluminum sheet 1 in the mathematical expression 10.

MATHEMATICAL EXPRESSION 10

$$T_{SGR} = \frac{L_{SGR}}{V}$$

MATHEMATICAL EXPRESSION 11

$$Y_{GR}(s) = \frac{1}{T_{SGR} \cdot s + 1} \cdot Y_S(s)$$

In the mathematical expression 11, "s" is a differential operator (s=d/dt). The mathematical expression 11 can be expressed in the form of an equation of motion as in the following mathematical expression 12 using the amount of meandering $y_{GR}$ of the aluminum sheet 1 at the guide position of the meander control system 900, the time derivative $y_{GR}'$ of the amount of meandering of the aluminum sheet 1 at the guide position of the meander control system 900, and the amount of meandering $y_S$ of the aluminum sheet 1 detected by the edge sensor 921 at the position of the detection.

$$T_{SGR} \cdot y_{GR}' + y_{GR} = y_S \qquad \text{MATHEMATICAL EXPRESSION 12}$$

The time derivative $y_{GR}'$ of the amount of meandering of the aluminum sheet 1 at the guide position of the meander control system 900 is expressed by the following mathematical expression 13 using the period (sampling period) $\Delta t$ of the detection of the amount of meandering of the aluminum sheet 1 by the edge sensor 921, the amount of meandering $y_{GR}(t_m)$ of the aluminum sheet 1 at the guide position of the meander control system 900 at time $t_m$, and the amount of meandering $y_{GR}(t_{m-1})$ of the aluminum sheet 1 at the guide position of the meander control system 900 at time $t_{m-1}$ that is earlier by $\Delta t$ than time $t_m$.

MATHEMATICAL EXPRESSION 13

$$y_{GR'} = \frac{y_{GR}(t_m) - y_{GR}(t_{m-1})}{\Delta t}$$

After the mathematical expression 13 is substituted in the mathematical expression 12, the mathematical expression 12 can be written as the following mathematical expression 14.

MATHEMATICAL EXPRESSION 14

$$y_{GR}(t_m) = \frac{T_{SGR}}{T_{SGR} + \Delta t} \cdot y_{GR}(t_{m-1}) + \frac{\Delta t}{T_{SGR} + \Delta t} \cdot y_S(t_m)$$

In the mathematical expression 14, $y_S(t_m)$ represents the amount of meandering of the aluminum sheet 1 detected by the edge sensor 921 at the position of the detection at time $t_m$. In the case where the period $\Delta t$ is sufficiently smaller than the time constant $T_{SGR}$ ($\Delta t \gg T_{SGR}$), an approximate expression shown below as the mathematical expression 15 holds.

$$\frac{T_{SGR}}{T_{SGR} + \Delta t} \approx 1 \qquad \text{MATHEMATICAL EXPRESSION 15}$$

By substituting the mathematical expression 15 in the mathematical expression 14, a related-art feedforward model shown by the following mathematical expression 16 is derived.

MATHEMATICAL EXPRESSION 16

$$y_{GR}(t_m) = y_{GR}(t_{m-1}) + \frac{\Delta t}{T_{SGR} + \Delta t} \cdot y_S(t_m)$$
$$= y_{GR}(t_{m-1}) + K_0 \cdot y_S(t_m)$$

As shown by the mathematical expression 16, the amount of meandering $y_{GR}(t_m)$ of the aluminum sheet 1 at the guide position of the meander control system 900 at time $t_m$ can be expressed by the sum of the amount of meandering $y_{GR}(t_{m-1})$ of the aluminum sheet 1 at the guide position of the meander control system 900 at time $t_{m-1}$ that is earlier by the period $\Delta t$ than time $t_m$, and the multiplication product of the amount of meandering $y_S(t_m)$ of the aluminum sheet 1 detected by the edge sensor 921 at the position of the detection at time $t_m$ by a gain $K_0$.

If it is supposed that the gain $K_0$ in the mathematical expression 16 is constant, the amount of meandering $y_{GR}(t_m)$ of the aluminum sheet 1 at the guide position of the meander control system 900 at time $t_m$ is expressed as in the following mathematical expression 17 using an initial value $Y_{GR0}$ of the amount of meandering of the aluminum sheet 1 at the guide position of the meander control system 900, and the amounts of meandering $y_S(t_1), y_S(t_2), \ldots y_S(t_m)$ that are values detected by the edge sensor 921 every period $\Delta t$.

$$y_{GR}(t_m) = y_{GR0} + K_0 \cdot \{y_S(t_1) + y_S(t_2) + \ldots + y_S(t_m)\} \quad \text{MATHEMATICAL EXPRESSION 17}$$

According to the mathematical expression 17, it is concluded that it is possible to estimate the "amount of meandering $y_{GR}(t_m)$ of the aluminum sheet 1 at the guide position of the meander control system 900 at time $t_m$" on the basis of the "initial value $y_{GR0}$ of the amount of meandering of the aluminum sheet 1 at the guide position of the meander control system 900", and the "total sum (integrated value) of the values detected by the edge sensor 921" at every period $\Delta t$.

However, in reality, the conveying condition of the aluminum sheet 1 changes (e.g., the thickness of the aluminum sheet 1 changes, or the conveying velocity V changes, etc.), so that the friction force between the rollers 11, 12 . . . , that constitute the conveyance device 10, and the aluminum sheet 1 changes moment by moment, and therefore the gain $K_0$ also changes moment by moment. Therefore, in the case where the "amount of meandering $y_{GR}(t_m)$ of the aluminum sheet 1 at the guide position at time $t_m$" is calculated on the basis of the mathematical expression 17 that has a prerequisite condition that the gain $K_0$ be constant, the change in the gain $K_0$ with elapse of time, that is, error of the gain $K_0$, becomes an external disturbance factor, and is integrated in the calculated value of the amount of meandering $y_{GR}(t_m)$ on and on, so that the accuracy (reliability) of the calculated value of the amount of meandering $y_{GR}(t_m)$ rather declines.

The meander control of the aluminum sheet 1 by the meander control system 100 shown in FIG. 1 improves the accuracy of the calculated value of the amount of meandering $y_{GR}(t_m)$ by eliminating the foregoing problem in the meander control of the aluminum sheet 1 by the meander control system 900 (effect of an error arising from change of the conveying condition of the aluminum sheet 1, and therefore a change in the friction force between the aluminum sheet 1 and the rollers 11, 12 . . . that constitute the conveyance device 10).

Hereinafter, the concept of the meander control of the aluminum sheet 1 performed by the meander control system 100 will be shown. Firstly, a relation between the amount of meandering of the aluminum sheet 1 at the "first detection position" that is the position at which the first edge sensor 121 detects the amount of meandering of the aluminum sheet 1, and the amount of meandering of the aluminum sheet 1 at the "second detection position" that is the position at which the second edge sensor 122 detects the amount of meandering of the aluminum sheet 1 is expressed by a Laplace arithmetic expression.

The Laplace function $Y_{S2}(s)$ of the amount of meandering of the aluminum sheet 1 at the second detection position is expressed by a Laplace arithmetic expression as shown in the mathematical expression 18 using the Laplace function $Y_{S1}(s)$ of the amount of meandering of the aluminum sheet 1 at the first detection position, and the time constant $T_{S1S2}$ calculated by substituting in the mathematical expression 1 the distance from the first detection position to the second detection position along the conveying path of the aluminum sheet 1 (the distance from the first edge sensor 121 to the second edge sensor 122) $L_{S1S2}$, and the conveying velocity V of the aluminum sheet 1.

MATHEMATICAL EXPRESSION 1

$$T_{S1S2} = \frac{L_{S1S2}}{V}$$

MATHEMATICAL EXPRESSION 18

$$Y_{S2}(s) = \frac{1 + \Delta K}{(T_{S1S2} + \Delta T) \cdot s + 1} \cdot Y_{S1}(s)$$

In the mathematical expression 18, $\Delta T$ and $\Delta K$ represent errors resulting from changes in the friction force between the aluminum sheet 1 and the rollers 11, 12 . . . that constitute the conveyance device 10. The mathematical expression 18 can be expressed in the form of an equation of motion as in the following mathematical expression 19 using the amount of meandering $y_{S2}$ of the aluminum sheet 1 at the second detection position (the second amount of meandering), the time derivative $y_{S2}'$ of the amount of meandering of the aluminum sheet 1 at the second detection position, and the amount of meandering $y_{S1}$ of the aluminum sheet 1 at the first detection position (the first amount of meandering).

$$(T_{S1}S2 + \Delta T) \cdot y_{S2}' + y_{S2} = (1 + \Delta K) \cdot y_{S1} \quad \text{MATHEMATICAL EXPRESSION 19}$$

The time derivative $y_{S2}'$ of the amount of meandering of the aluminum sheet 1 at the second detection position is expressed by the following mathematical expression 20 using the period (sampling period) $\Delta t$ of the detection of the amount of meandering of the aluminum sheet 1 by the first edge sensor 121 and the second edge sensor 122, the amount of meandering $y_{S2}(t_m)$ of the aluminum sheet 1 at the second detection position at time $t_m$, and the amount of meandering $y_{S2}(t_{m-1})$ of the aluminum sheet 1 at the second detection position at time $t_{m-1}$ that is earlier by $\Delta t$ than time $t_m$.

MATHEMATICAL EXPRESSION 20

$$y_{S2'} = \frac{y_{S2}(t_m) - y_{S2}(t_{m-1})}{\Delta t}$$

After the mathematical expression 20 is substituted in the mathematical expression 19, the mathematical expression 19 can be written as the following mathematical expression 21.

MATHEMATICAL EXPRESSION 21

$$y_{S2}(t_m) = \frac{T_{S1S2} + \Delta T}{T_{S1S2} + \Delta T + \Delta t} \cdot y_{S2}(t_{m-1}) + \frac{(1 + \Delta K) \cdot \Delta t}{T_{S1S2} + \Delta T + \Delta t} \cdot y_{S1}(t_m)$$

In the mathematical expression 21, $y_{S1}(t_m)$ represents the amount of meandering of the aluminum sheet 1 at the first detection position at time $t_m$. In the case where the period $\Delta t$ is sufficiently smaller than the sum ($=T_{S1S2}+\Delta T$) of the time constant $T_{S1S2}$ and the error $\Delta T$ ($\Delta t \ll (T_{S1S2}+\Delta T)$), an approximate expression shown below as the following mathematical expression 22 holds.

MATHEMATICAL EXPPRESSION 22

$$\frac{T_{S1S2} + \Delta T}{T_{S1S2} + \Delta T + \Delta t} \approx 1$$

By substituting the mathematical expression 22 in the mathematical expression 21, a first feedforward model shown by the following mathematical expression 2 is derived.

MATHEMATICAL EXPRESSION 2

$$y_{S2}(t_m) = y_{S2}(t_{m-1}) + \frac{T_{S1S2} + \Delta T}{T_{S1S2} + \Delta T + \Delta t} \cdot y_{S1}(t_m)$$
$$= y_{S2}(t_{m-1}) + K_{S1S2}(t_m) \cdot y_{S1}(t_m)$$

As shown by the mathematical expression 2, the amount of meandering $y_{S2}(t_m)$ of the aluminum sheet 1 at the second detection position at time $t_m$ can be expressed by the sum of the amount of meandering $y_{S2}(t_{m-1})$ of the aluminum sheet 1 at the second detection position at time $t_{m-1}$ that is earlier by the period $\Delta t$ than time $t_m$, and the multiplication product of the amount of meandering $y_{S1}(t_m)$ of the aluminum sheet 1 at the first detection position at time $t_m$ by a gain $K_{S1S2}(t_m)$. It is to be noted herein that the gain $K_{S1S2}(t_m)$ contains the error $\Delta T$ and the error $\Delta K$ that indicate the influence that the change of the conveying condition has on the first feedforward model. Relations of the detected value from the first edge sensor 121 (i.e., the detected value of the amount of meandering of the aluminum sheet 1 at the first detection position), and the detected value from the second edge sensor 122 (i.e., the detected value of the amount of meandering of the aluminum sheet 1 at the second detection position) with the time constant $T_{S1S2}$ and the gain $K_{S1S2}(t_m)$ are as shown in FIG. 2.

In the case where it is supposed that the conveying velocity V is constant, it is possible to handle the time constant $T_{S1S2}$ as a constant. In the case where the time constant $T_{S1S2}$ is handled as a constant, it is possible to handle the mathematical expression 21 as an equation whose variables are $y_{S1}(t_m)$, $y_{S2}(t_m)$, $y_{S2}(t_{m-1})$, $\Delta T$ and $\Delta K$. Of these five variables, three variables $y_{S1}(t_m)$, $y_{S2}(t_m)$ and $y_{S2}(t_{m-1})$ can be acquired as a detected value from the first edge sensor 121, and detected values from the second edge sensor 122. Therefore, $\Delta T$ and $\Delta K$ can be calculated by substituting combinations of the values detected by the first edge sensor 121 and the values detected by the second edge sensor 122 at least two different times in the mathematical expression 21 to acquire two or more equations whose variables are $\Delta T$ and $\Delta K$, and then by solving the acquired two or more equations. In this embodiment, in order to improve the accuracy of the estimation of $\Delta T$ and $\Delta K$, a combination of $\Delta T$ and $\Delta K$ that minimizes the square sum A shown in the following mathematical expression 5 is calculated.

MATHEMATICAL EXPRESSION 5

$$\overset{*}{A} = \sum_{t=t_{a1}}^{t_{an}} \left\{ y_{S2}(t) - \frac{(1+\Delta K) \cdot \Delta t}{T_{S1S2} + \Delta T} \cdot y_{S1}(t) \right\}^2$$

$t_{a1}, t_{a2}, \ldots t_{an} < t_m$

In the mathematical expression 5, $t_{a1}$ to $t_{an}$ are times prior to time $t_m$ at which the first edge sensor 121 and the second edge sensor 122 detect the amount of meandering of the aluminum sheet 1. In this embodiment, time $t_{an}=t_{m-1}$, time $t_{a(n-1)}=t_{m-2}$, and time $t_{a1}=t_{m-n}$. In addition, although in the mathematical expression 5, the coefficient of $y_{S1}(t)$ is $\{(1+\Delta K)\cdot\Delta t/(T_{S1S2}+\Delta T)\}$, the coefficient may be $\{(1+\Delta K)\cdot\Delta t/(T_{S1S2}+\Delta T+\Delta t)\}$, that is, the gain $K_{S1S2}(t_m)$ in the mathematical expression 2. Next, a relation between the amount of meandering of the aluminum sheet 1 at the "second detection position" and the amount of meandering of the aluminum sheet 1 at the "guide position of the meander control system 100" at which the aluminum sheet 1 contacts the guide roller 110 is expressed by a Laplace arithmetic expression. Incidentally, in this embodiment, the guide position of the meander control system 100 refers to the position at which the aluminum sheet 1 contacts the rear roller 114R, in a strict sense.

The Laplace function $Y_{GR}(s)$ of the amount of meandering of the aluminum sheet 1 at the guide position of the meander control system 100 is expressed by a Laplace arithmetic expression, except for the following mathematical expression 23 using the Laplace function $Y_{S2}(s)$ of the amount of meandering of the aluminum sheet 1 at the second detection position, the distance from the second detection position to the guide position on the conveying path of the aluminum sheet 1 (the distance from the second edge sensor 122 to the guide roller 110) $L_{S2GR}$, and the time constant $T_{S2GR}$ calculated by substituting the conveying velocity V of the aluminum sheet 1 in the mathematical expression 3.

MATHEMATICAL EXPRESSION 3

$$T_{S2GR} = \frac{(L_{S2GR})}{(V)}$$

MATHEMATICAL EXPRESSION 23

$$Y_{GR}(s) = \frac{(1+\Delta K)}{(T_{S2GR}+\Delta T)\cdot s + 1} \cdot Y_{S2}(s)$$

The mathematical expression 23 can be expressed in the form of an equation of motion as in the following mathematical expression 24 using the amount of meandering $y_{GR}$ of the aluminum sheet 1 at the guide position of the meander control system 100, the time derivative $y_{GR}'$ of the amount of meandering of the aluminum sheet 1 at the guide position of the meander control system 100, and the amount of meandering $y_{S2}$ of the aluminum sheet 1 at the second detection position.

$$(T_{S2GR}+\Delta T)\cdot y_{GR}'+y_{GR}=(1+\Delta K)\cdot y_{S2}$$

MATHEMATICAL EXPRESSION 24

The time derivative $y_{GR}'$ of the amount of meandering of the aluminum sheet 1 at the guide position of the meander control system 100 is expressed by the following mathematical expression 25 using the period (sampling period) $\Delta t$ of the detection of the amount of meandering of the aluminum sheet 1 by the first edge sensor 121 and the second edge sensor 122, the amount of meandering $y_{GR}(t_m)$ of the aluminum sheet 1 at the guide position of the meander control system 100 at time $t_m$, and the amount of meandering $y_{GR}(t_{m-1})$ of the aluminum sheet 1 at the guide position of the meander control system 100 at time $t_{m-1}$ that is earlier by $\Delta t$ than time $t_m$.

$$y_{GR'} = \frac{y_{GR}(t_m) - y_{GR}(t_{m-1})}{\Delta t}$$

MATHEMATICAL EXPRESSION 25

After the mathematical expression 25 is substituted in the mathematical expression 24, the mathematical expression 24 can be written as the following mathematical expression 26.

MATHEMATICAL EXPRESSION 26

$$y_{GR}(t_m) = \frac{T_{S2GR} + \Delta T}{T_{S2GR} + \Delta T + \Delta t} \cdot y_{GR}(t_{m-1}) + \frac{(1 + \Delta K) \cdot \Delta t}{T_{S2GR} + \Delta T + \Delta t} \cdot y_{S2}(t_m)$$

In the mathematical expression 26, $y_{S2}(t_m)$ represents the amount of meandering of the aluminum sheet 1 at the second detection position at time $t_m$. In the case where the period $\Delta t$ is sufficiently smaller than the sum of the time constant $T_{S2GR}$ and the error $\Delta T$ ($\Delta t \ll (T_{SGR} + \Delta T)$), an approximate expression shown below as the mathematical expression 27 holds.

MATHEMATICAL EXPRESSION 27

$$\frac{T_{S2GR} + \Delta T}{T_{S2GR} + \Delta T + \Delta t} \approx 1$$

By substituting the mathematical expression 27 in the mathematical expression 26, a second feedforward model shown by the following mathematical expression 4 is derived.

MATHEMATICAL EXPRESSION 4

$$y_{GR}(t_m) = y_{GR}(t_{m-1}) + \frac{T_{S2GR} + \Delta T}{T_{S2GR} + \Delta T + \Delta t} \cdot y_{S2}(t_m)$$
$$= y_{GR}(t_{m-1}) + K_{S2GR}(t_m) \cdot y_{S2}(t_m)$$

In the case where it is supposed that the conveying velocity V is constant and it is also supposed that the combination of $\Delta T$ and $\Delta K$ in the first feedforward model and the combination of $\Delta T$ and $\Delta K$ in the second feedforward model are the same at the same time, if $\Delta T$ and $\Delta K$ calculated on the basis of the mathematical expression 5 are substituted in the mathematical expression 4, the amount of meandering $y_{GR}(t_m)$ of the aluminum sheet 1 at the guide position of the meander control system 100 at time $t_m$ is expressed as the sum of the amount of meandering $y_{GR}(t_{m-1})$ of the aluminum sheet 1 at the guide position of the meander control system 100 at time $t_{m-1}$ that is earlier by the period $\Delta t$ than time $t_m$, and the multiplication product of the amount of meandering $y_{S2}(t_m)$ of the aluminum sheet 1 at the second detection position at time $t_m$ by the gain $K_{S2GR}(t_m)$.

Therefore, the amount of meandering $y_{GR}(t_m)$ of the aluminum sheet 1 at the guide position of the meander control system 100 at time $t_m$ is expressed by the following mathematical expression 6 using a pre-set "initial value $y_{GR0}$ of the amount of meandering of the aluminum sheet 1 at the guide position of the meander control system 100 (usually, set as $y_{GR0}=0$)", the gains $K_{S2GR}(t_1), K_{S2GR}(t_2), \ldots K_{S2GR}(t_m)$, and the amounts of meandering $y_{S2}(t_1), y_{S2}(t_2), \ldots y_{S2}(t_m)$ of the aluminum sheet 1 detected by the second edge sensor 122 at every period $\Delta t$.

$$y_{GR}(t_m) = y_{GR0} + \{K_{S2}GR(t_1) \cdot y_{S2}(t_1) + K_{S2}GR(t_2) \cdot y_{S2}(t_2) + \ldots + K_{S2}GR(t_m) \cdot y_{S2}(t_m)\}$$

MATHEMATICAL EXPRESSION 6

Hereinafter, a meander control method for the aluminum sheet 1 performed by the meander control system 100 will be described with reference to FIG. 3.

The meander control method for the aluminum sheet 1 performed by the meander control system 100 includes a series of operations (1-1) to (1-5) as shown below which the control device 131 performs. Incidentally, the amount of movement of the guide roller 110 in the embodiment substantially corresponds to the amount of elongation/contract of the hydraulic cylinder 115, and therefore corresponds to the amount of turn (turning angle) of a combined unit of the turning frame 113, the front roller 114F, and the rear roller 114R.

(1-1) The control device 131 calculates the error contained in the "first gain" that is the gain of the "first feedforward model" that estimates the amount of meandering of the aluminum sheet 1 at the second detection position on the basis of the amount of meandering of the aluminum sheet 1 at the first detection position, on the basis of the amount of meandering of the aluminum sheet 1 detected by the first edge sensor 121 (a detected value from the first edge sensor 121), and the amount of meandering of the aluminum sheet 1 detected by the second edge sensor 122 (a detected value from the second edge sensor 122). The operation (1-1) corresponds to an error calculation step S1100 shown in FIG. 3. More specifically, the control device 131 calculates, as an action corresponding to the operation (1-1), a "combination of $\Delta T$ and $\Delta K$ at time $t_1$" that minimizes the square sum A that is obtained by substituting in the mathematical expression 5 the values detected by the first edge sensor 121 and the values detected by the second edge sensor 122 at times $t_{a1}$ to $t_{an}$.

(1-2) The control device 131 corrects the "second gain" that is the gain of the "second feedforward model" of estimating the amount of meandering of the aluminum sheet 1 at the guide position of the meander control system 100 on the basis of the amount of meandering of the aluminum sheet 1 at the second detection position. The operation (1-2) corresponds to a gain correction step S1200 in FIG. 3. More specifically, the control device 131 calculates, as an action corresponding to the operation (1-2), the gain $K_{S2GR}(t_1)$ of the second feedforward model at time $t_1$ by substituting in the mathematical expression 4 "the combination of $\Delta T$ and $\Delta K$ at time $t_1$" that is calculated in the operation (1-1).

(1-3) The control device 131 calculates a "guide position-estimated amount of meandering" that is an estimated value of the amount of meandering of the aluminum sheet 1 at the guide position of the meander control system 100, on the basis of the second feedforward model (corrected second feedforward model) that uses the second gain corrected on the basis of the error calculated in the operation (1-1), and the amount of meandering of the aluminum sheet 1 detected by the second edge sensor 122 (detected value from the second edge sensor 122). The operation (1-3) corresponds to a guide position-estimated meander amount calculation step S1300 shown in FIG. 3. More specifically, the control device 131 calculates, as an action corresponding to the operation (1-3), the "guide position-estimated amount of meandering $y_{GR}(t_1)$ at time $t_1$" by substituting in the mathematical expression 6 the detected value from the second edge sensor 122 at time $t_1$ as the amount of meandering $y_{S2}(t_1)$ of the aluminum sheet 1 at the second detection position at time $t_1$, and by substituting in the mathematical expression 6 the calculated gain $K_{S2GR}(t_1)$ of the second feedforward model at time $t_1$.

(1-4) The control device 131 calculates an amount of cancel-out movement on the basis of the "guide position-estimated amount of meandering" calculated in the operation (1-3), and a pre-set "relation between the amount of meandering of the aluminum sheet 1 at the guide position of the meander control system 100 and the amount of cancel-out movement that is the amount of movement of the guide roller 110 for cancelling out the amount of meandering at the guide position". The operation (1-4) corresponds to a cancel-out movement amount calculation step S1400 shown in FIG. 3. More specifically, the control device 131 calculates, as an action corresponding to the operation (1-4), the "amount of cancel-out movement at time $t_1$" by substituting the "guide position-estimated amount of meandering $y_{GR}(t_1)$ at time $t_1$"

calculated in the operation (1-3) in a pre-set "relational expression between the amount of meandering of the aluminum sheet 1 at the guide position of the meander control system 100 and the amount of cancel-out movement that is the amount of movement of the guide roller 110 for cancelling out the amount of meandering at the guide position". In addition, the "relational expression between the amount of meandering of the aluminum sheet 1 at the guide position of the meander control system 100 and the amount of cancel-out movement that is the amount of movement of the guide roller 110 for cancelling out the amount" in this embodiment is a relational expression found beforehand through experiments or the like. However, the invention is not limited to this embodiment, and this relational expression may also be derived from theoretical calculations or the like.

(1-5) The control device 131 sends to the guide roller 110 a command signal for causing the guide roller 110 to move by the amount of cancel-out movement calculated in the operation (1-4). The operation (1-5) corresponds to a command signal sending step S1500 shown in FIG. 3. More specifically, the control device 131 sends to the guide roller 110 a command signal for causing the guide roller 110 to move by the calculated "amount of cancel-out movement at time $t_1$".

As a result of the foregoing operations (1-1) to (1-5), the guide roller 110 alters the conveying direction of the aluminum sheet 1 on the basis of the command signal from the control device 131.

The control device 131 repeats the actions corresponding to the operations (1-1) to (1-5) every period $\Delta t$. Incidentally, the gains $K_{S2GR}(t_1)$, $K_{S2GR}(t_2)$, ... $K_{S2GR}(t_m)$ calculated every period $\Delta t$ correspond to "corrected second gains".

As described above, the meander control system 100 includes: the guide roller 110 that is disposed on an intermediate portion of the conveying path of the aluminum sheet 1, and that alters the conveying direction of the aluminum sheet 1 by moving in contact with the aluminum sheet 1 that is conveyed along the conveying path; the first edge sensor 121 that is disposed at the first detection position that is at the upstream side of the guide roller 110 along the conveying path, and that detects the amount of meandering of the aluminum sheet 1 at the first detection position; the second edge sensor 122 that is disposed at the second detection position between the first edge sensor 121 and the guide roller 110 on the conveying path, and that detects the amount of meandering of the aluminum sheet 1 at the second detection position; and the control device 131 that calculates the errors ($\Delta T$ and $\Delta K$) contained in the first gain ($K_{S1S2}(t_m)$) of the first feedforward model in which the amount of meandering of the aluminum sheet 1 at the second detection position is estimated on the basis of the amount of meandering of the aluminum sheet 1 at the first detection position, on the basis of the detected value from the first edge sensor 121 and the detected value from the second edge sensor 122, and corrects, by the errors ($\Delta T$ and $\Delta K$) calculated earlier, the second gain $K_{S2GR}(t_m)$ of the second feedforward model in which the amount of meandering of the aluminum sheet 1 at the guide position is estimated on the basis of the amount of meandering of the aluminum sheet 1 at the second detection position, and calculates the guide position-estimated amount of meandering $y_{GR}(t_m)$ that is an estimated value of the amount of meandering of the aluminum sheet 1 at the guide position on the basis of the second feedforward model that employs the second gain $K_{S2GR}(t_m)$ corrected by the calculated errors ($\Delta T$ and $\Delta K$), and also on the basis of the detected value from the second edge sensor 122, and calculates the amount of cancel-out movement on the basis of the calculated guide position-estimated amount of meandering $y_{GR}(t_m)$, and the pre-set "relation between the amount of meandering of the aluminum sheet 1 at the guide position and the amount of cancel-out movement that is the amount of movement of the guide roller 110 for cancelling out the amount of meandering at the guide position", and sends to the guide roller 110 a command signal for causing the guide roller 110 to move by the calculated amount of cancel-out movement. This construction has the following advantages. That is, the meander control system 100 sequentially calculates the influence of the change of the conveying condition of the aluminum sheet 1 on the conveying path (the friction force between the aluminum sheet 1 and the group of rollers constituting the conveying device 10) as the errors ($\Delta T$ and $\Delta K$) by substituting, in the first feedforward model, the amounts of meandering detected by the first edge sensor 121 and the second edge sensor 122 (the detected value from the first edge sensor 121 and the detected value from the second edge sensor 122) that are disposed at different positions (the first detection position and the second detection position) on the conveying path. Then, the meander control system 100 reflects the errors in the second feedforward model to calculate the amount of cancel-out movement of the guide roller 110. Therefore, it is possible to effectively restrain the meandering of the aluminum sheet 1 even in the case where the conveying condition changes moment by moment.

Besides, the first feedforward model of the meander control system 100 is expressed by the mathematical expression 2 using the amount of meandering $y_{S2}(t_m)$ of the aluminum sheet 1 at the second detection position at time $t_m$, the amount of meandering $y_{S2}(t_{m-1})$ of the aluminum sheet 1 at the second detection position at time $t_{m-1}$ that is earlier than time $t_m$ by the period $\Delta t$ in which the first edge sensor 121 and the second edge sensor 122 repeat the detection of the amount of meandering of the aluminum sheet 1, the amount of meandering $y_{S1}(t_m)$ of the aluminum sheet 1 at the first detection position at time $t_m$, the time constant $T_{S1S2}$ calculated by substituting in the mathematical expression 1 the distance $L_{S1S2}$ from the first detection position to the second detection position along the conveying path, and the conveying velocity V of the aluminum sheet 1, the error $\Delta T$, and the error $\Delta K$. The second feedforward model of the meander control system 100 is expressed by the mathematical expression 4 using the amount of meandering $y_{GR}(t_m)$ of the aluminum sheet 1 at the guide position at time $t_m$, the amount of meandering $y_{GR}(t_{m-1})$ of the aluminum sheet 1 at the guide position at time $t_{m-1}$, the amount of meandering $y_{S2}(t_m)$ of the aluminum sheet 1 at the second detection position at time $t_m$, the time constant $T_{S2GR}$ calculated by substituting in the mathematical expression 3 the distance $L_{S2GR}$ from the second detection position to the guide position along the conveying path and the conveying velocity V of the aluminum sheet 1, the error $\Delta T$, and the error $\Delta K$. The control device 131 of the meander control system 100 repeatedly performs, from time $t_1$ to time $t_m$, the operation of calculating a combination of the error $\Delta T$ and the error $\Delta K$ that minimizes the square sum A obtained by substituting in the mathematical expression 5 the time constant $T_{S1S2}$, the period $\Delta t$, the detected values $y_{S1}(t_{a1})$, $y_{S1}(t_{a2})$, ... $Y_{S1}(t_{an})$ from the first edge sensor 121 at times $t_{a1}, t_{a2}, \ldots t_{an}$ (n is an integer of 2 or greater) that are earlier than time $t_m$, and the detected values $y_{S2}(t_{a1})$, $y_{S2}(t_{a2})$, ... $y_{S2}(t_{an})$ from the second edge sensor 122 at times $t_{a1}, t_{a2}, \ldots t_{an}$, as the combination of the error $\Delta T$ and the error $\Delta K$ at time $t_m$, and calculates the second gains $K_{S2GR}(t_1)$, $K_{S2GR}(t_2)$, ... $K_{S2GR}(t_m)$ that correspond to time $t_1$ to time $t_m$, respectively, on the basis of the combinations of the error $\Delta T$ and the error $\Delta K$ that correspond to time $t_1$ to time $t_m$, respectively, and calculates the guide position-estimated amount of meandering $y_{GR}(t_m)$ at time $t_m$ by substituting in the mathematical expression 6 the calculated second gains, and the detected values $y_{S2}(t_1)$, $y_{S2}(t_2)$, ... $y_{S2}(t_m)$ from the second edge sensor 122 at time $t_1$ to time $t_m$. Due to this construction, the estimation accuracy of the error $\Delta T$ and the error $\Delta K$ improves, and thus it becomes possible to effectively restrain the meandering of the aluminum sheet 1.

As described above, the first embodiment of the meander control method in accordance with the invention is a meander control method of controlling the amount of meandering of the aluminum sheet 1 conveyed along the conveying path, by using: the guide roller 110 that is disposed on an intermediate portion of the conveying path of the aluminum sheet 1, and that alters the conveying direction of the aluminum sheet 1 by moving in contact with the aluminum sheet 1 that is conveyed along the conveying path; the first edge sensor 121 that is disposed at the first detection position upstream of the guide roller 110 along the conveying path, and that detects the amount of meandering of the aluminum sheet 1 at the first detection position; and the second edge sensor 122 that is disposed at the second detection position between the first edge sensor 121 and the guide roller 110 on the conveying path, and that detects the amount of meandering of the aluminum sheet 1 at the second detection position, the control method including: the error calculation step S1100 of calculating the errors ($\Delta T$ and $\Delta K$) contained in the first gain $K_{S1S2}(t_m)$ of the first feedforward model in which the amount of meandering of the aluminum sheet 1 at the second detection position is detected on the basis of the amount of meandering of the aluminum sheet 1 at the first detection position, on the basis of the detected values from the first edge sensor 121 and the second edge sensor 122; the gain correction step S1200 of correcting the second gain $K_{S2GR}(t_m)$ of the second feedforward model in which the amount of meandering of the aluminum sheet 1 at the guide position is detected on the basis of the amount of meandering of the aluminum sheet 1 at the second detection position, on the basis of the errors ($\Delta T$ and $\Delta K$); the guide position-estimated meander amount calculation step S1300 of calculating the guide position-estimated amount of meandering $y_{GR}(t_m)$ that is an estimated value of the amount of meandering of the aluminum sheet 1 at the guide position on the basis of the second feedforward model that employs the second gain $K_{S2GR}(t_m)$ corrected by the errors ($\Delta T$ and $\Delta K$) calculated earlier, and on the basis of the detected value from the second edge sensor 122; the cancel-out movement amount calculation step S1400 of calculating the amount of cancel-out movement on the basis of the calculated guide position-estimated amount of meandering $y_{GR}(t_m)$, and the pre-set "relation between the amount of meandering of the aluminum sheet 1 at the guide position and the amount of cancel-out movement that is the amount of movement of the guide roller 110 for cancelling out the amount of meandering at the guide position"; and the command signal sending step S1500 of sending to the guide roller 110 the command signal for causing the guide roller 110 to move by the calculated amount of cancel-out movement. This construction has the following advantages. That is, the first embodiment of the meander control method in accordance with the invention sequentially calculates the influence of the change of the conveying condition of the aluminum sheet 1 on the conveying path (the friction force between the aluminum sheet 1 and the group of rollers constituting the conveying device 10) as the errors ($\Delta T$ and $\Delta K$) by substituting, in the first feedforward model, the amounts of meandering detected by the first edge sensor 121 and the second edge sensor 122 (the detected value from the first edge sensor 121 and the detected value from the second edge sensor 122) that are disposed at different positions (the first detection position and the second detection position) on the conveying path. Then, the first embodiment of the meander control method reflects the errors in the second feedforward model to calculate the amount of cancel-out movement of the guide roller 110. Therefore, it is possible to effectively restrain the meandering of the aluminum sheet 1 even in the case where the conveying condition changes moment by moment.

Besides, the first feedforward model in the first embodiment of the meander control method in accordance with the invention is expressed by the mathematical expression 2 using the amount of meandering $y_{S2}(t_m)$ of the aluminum sheet 1 at the second detection position at time $t_m$, the amount of meandering $y_{S2}(t_{m-1})$ of the aluminum sheet 1 at the second detection position at time $t_{m-1}$ that is earlier than time $t_m$ by the period $\Delta t$ in which the first edge sensor 121 and the second edge sensor 122 repeat the detection of the amount of meandering of the aluminum sheet 1, the amount of meandering $y_{S1}(t_m)$ of the aluminum sheet 1 at the first detection position at time $t_m$, the time constant $T_{S1S2}$ calculated by substituting in the mathematical expression 1 the distance $L_{S1S2}$ from the first detection position to the second detection position along the conveying path, and the conveying velocity V of the aluminum sheet 1, the error $\Delta T$, and the error $\Delta K$. The second feedforward model in the first embodiment of the meander control method in accordance with the invention is expressed by the mathematical expression 4 using the amount of meandering $y_{GR}(t_m)$ of the aluminum sheet 1 at the guide position at time $t_m$, the amount of meandering $y_{GR}(t_{m-1})$ of the aluminum sheet 1 at the guide position at time $t_{m-1}$, the amount of meandering $y_{S2}(t_m)$ of the aluminum sheet 1 at the second detection position at time $t_m$, the time constant $T_{S2GR}$ calculated by substituting in the mathematical expression 3 the distance $L_{S2GR}$ from the second detection position to the guide position along the conveying path and conveying velocity V of the aluminum sheet 1, the error $\Delta T$, and the error $\Delta K$. In the error calculation step S1100 in the first embodiment of the meander control method in accordance with the invention, the operation of calculating a combination of the error $\Delta T$ and the error $\Delta K$ that minimizes the square sum A obtained by substituting in the mathematical expression 5 the time constant $T_{S1S2}$, the period $\Delta t$, the detected values $y_{S1}(t_{a1})$, $y_{S1}(t_{a2})$, ... $y_{S1}(t_{an})$ from the first edge sensor 121 at times $t_{a1}$, $t_{a2}$, ... $t_{an}$ (n is an integer of 2 or greater) that are earlier than time $t_m$, and the detected values $y_{S2}(t_{a1})$, $y_{S2}(t_{a2})$, ... $y_{S2}(t_{an})$ from the second edge sensor 122 at times $t_{a1}$, $t_{a2}$, ... $t_{an}$ as the combination of the error $\Delta T$ and the error $\Delta K$ at time $t_m$ is repeatedly performed from time $t_1$ to time $t_m$. In the gain correction step S1200 in the first embodiment of the meander control method in accordance with the invention, the second gains $K_{S2GR}(t_1)$, $K_{S2GR}(t_2)$, ... $K_{S2GR}(t_m)$ that correspond to time $t_1$ to time $t_m$, respectively, are calculated on the basis of the combinations of the error $\Delta T$ and the error $\Delta K$ that correspond to time $t_1$ to time $t_m$, respectively. In the guide position-estimated meander amount calculation step S1300, the guide position-estimated amount of meandering $y_{GR}(t_m)$ at time $t_m$ is calculated by substituting in the mathematical expression 6 the calculated second gains, and the detected values $y_{S2}(t_1)$, $y_{S2}(t_2)$, ... $y_{S2}(t_m)$ from the second edge sensor 122 at time $t_1$ to time $t_m$. Due to this construction, the estimation accuracy of the error $\Delta T$ and the error $\Delta K$ improves, and thus it becomes possible to effectively restrain the meandering of the aluminum sheet 1.

In this embodiment, the ranges for the error $\Delta T$ and the error $\Delta K$ are pre-set, and the errors $\Delta T$ and $\Delta K$ are calculated within the ranges. Due to this construction, it is possible to shorten the amount of time needed for the calculation of the errors ΔT and ΔK, and it is also possible to prevent either one of the calculated values of the errors ΔT and ΔK from becoming a local solution that is physically impossible. Concrete examples of the method of calculating the errors ΔT and ΔK within pre-set ranges include a method in which the minimum value and the maximum value of the error ΔT, and the minimum value and the maximum value of the error ΔK are set beforehand, and in which if a calculated value of the error ΔT is smaller than the pre-set minimum value of the error ΔT, the pre-set minimum value of the error ΔT is handled as a substitute for the calculated value of the error ΔT, and if a calculated value of the error ΔT is larger than the pre-set maximum value of the error ΔT, the pre-set maximum value of the error ΔT is handled as a substitute for the calculated value of the error ΔT, and in which if a calculated value of the error ΔK is smaller than the pre-set minimum value of the error ΔK, the pre-set minimum value of the error ΔK is handled as a substitute for the calculated value of the error ΔK, and if a calculated value of the error ΔK is larger than the pre-set maximum value of the error ΔK, the pre-set maximum value of the error ΔK is handled as a substitute for the calculated value of the error ΔT.

Figure 4:
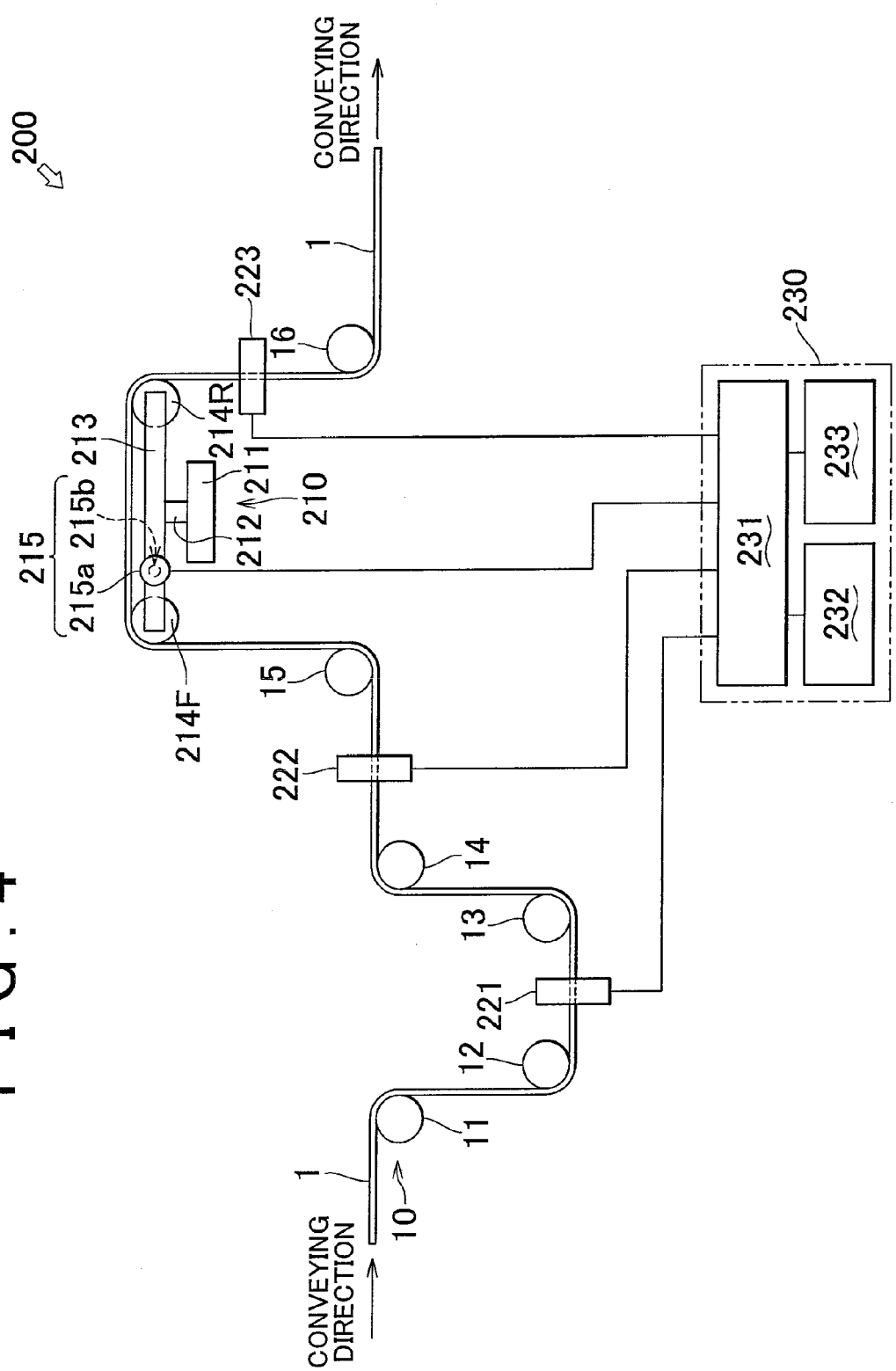
FIG. 4 is a diagram showing a second embodiment of the meander control system in accordance with the invention.
Figure 5:
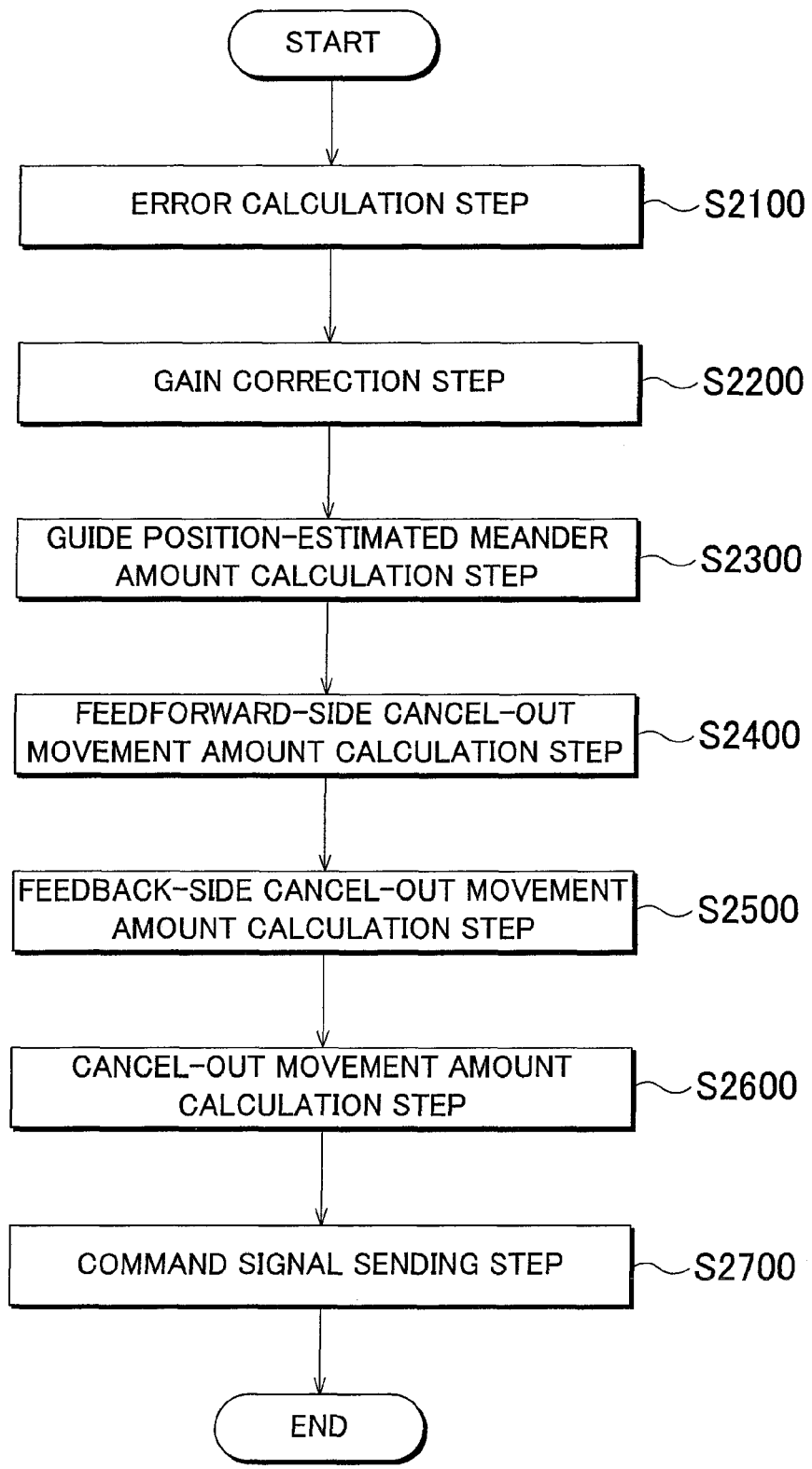
FIG. 5 is a flowchart showing a second embodiment of the meander control method in accordance with the invention.

Hereinafter, a meander control system 200 that is a second embodiment of the meander control system in accordance with the invention will be described with reference to FIG. 4 and FIG. 5. As shown in FIG. 4, the meander control system 200 controls the meandering of an aluminum sheet 1 that is conveyed by a conveyance device 10, and mainly includes a guide roller 210, a first edge sensor 221, a second edge sensor 222, a third edge sensor 223, and a control unit 230. Incidentally, the restraint of the meandering (meander control) of the aluminum sheet 1 by the meander control system 200 corresponds to a second embodiment of the meander control method in accordance with the invention.

The guide roller 210 mainly includes a base 211, a turning shaft 212, a turning frame 213, a front roller 214F, a rear roller 214R, and a hydraulic cylinder 215. The hydraulic cylinder 215 includes a cylinder main part 215a, and a cylinder rod 215b. Basic constructions of the guide roller 210, the first edge sensor 221 and the second edge sensor 222 are substantially the same as those of the guide roller 110, the first edge sensor 121 and the second edge sensor 122 shown in FIG. 1, and therefore detailed descriptions thereof are omitted herein.

The third edge sensor 223 is an embodiment of a third meander amount sensor in accordance with the invention, and detects the amount of meandering of the aluminum sheet 1. The third edge sensor 223 is disposed at a "third detection position" that is at the downstream side of the guide roller 210 along the conveying path of the aluminum sheet 1. In this embodiment, the "third detection position" is set at a position between the rear roller 214R of the guide roller 210 and the roller 16.

The control unit 230 includes a control device 231, an input device 232, and a display device 233.

The control device 231 is an embodiment of the control device in accordance with the invention. The control device 231 is able to store various programs and the like, and to expand these programs and the like, and to perform predetermined computations following these programs and the like, and to store results of the computations and the like, and to output the results of the computations and the like to an external device.

The control device 231 may be constructed substantially of a CPU, a ROM, a RAM, an HDD, etc. that are interconnected by a bus, or may also be constructed of a chip of LSI, or the like. The control device 231 in this embodiment is a dedicated device, but may also be realized by a commercially available device, such as a personal computer, a work station, etc., that appropriately stores programs and the like.

The control device 231 is connected to the first edge sensor 221. The control device 231 is able to acquire the amount of meandering of the aluminum sheet 1 at the first detection position which is detected by the first edge sensor 221, that is, is able to acquire the "detected value of the amount of meandering of the aluminum sheet 1 at the first detection position". The control device 231 is also connected to the second edge sensor 222. The control device 231 is able to acquire the amount of meandering of the aluminum sheet 1 at the second detection position which is detected by the second edge sensor 222, that is, the "detected value of the amount of meandering of the aluminum sheet 1 at the second detection position". The control device 231 is also connected to the third edge sensor 223. The control device 231 is able to acquire the amount of meandering of the aluminum sheet 1 at the third detection position which is detected by the second edge sensor 223, that is, the "detected value of the amount of meandering of the aluminum sheet 1 at the third detection position".

The control device 231 is connected to the hydraulic cylinder 215 of the guide roller 210 (more strictly speaking, a switching valve provided on an oil passageway for supplying the working oil to the hydraulic cylinder 215). The control device, 231 is able to send a command signal to the hydraulic cylinder 215. The hydraulic cylinder 215 elongates or contracts according to the command signal sent from the control device 231.

Basic constructions of the input device 232 and the display device 233 are substantially the same as those of the input device 132 and the display device 133 shown in FIG. 1, and detailed descriptions thereof are omitted herein.

Hereinafter, a meander control method of the aluminum sheet 1 performed by the meander control system 200 with reference to FIG. 5.

The meander control method for the aluminum sheet 1 by performed the meander control system 200 includes a series of operations (2-1) to (2-5) as shown below which the control device 231 performs. Incidentally, the amount of movement of the guide roller 210 in the embodiment substantially corresponds to the amount of elongation/contract of the hydraulic cylinder 215, and therefore corresponds to the amount of turn (turning angle) of a combined unit of the turning frame 213, the front roller 214F, and the rear roller 214R.

(2-1) The control device 231 calculates the error contained in the "first gain" that is the gain of the "first feedforward model" that estimates the amount of meandering of the aluminum sheet 1 at the second detection position on the basis of the amount of meandering of the aluminum sheet 1 at the first detection position, on the basis of the amount of meandering of the aluminum sheet 1 detected by the first edge sensor 221 (a detected value from the first edge sensor 221), and the amount of meandering of the aluminum sheet 1 detected by the second edge sensor 222 (a detected value from the second edge sensor 222). The operation (2-1) corresponds to an error calculation step S2100 shown in FIG. 5.

(2-2) The control device 231 corrects the "second gain" that is the gain of the "second feedforward model" of estimating the amount of meandering of the aluminum sheet 1 at the guide position of the meander control system 200 on the basis of the amount of meandering of the aluminum sheet 1 at the second detection position. The operation (2-2) corresponds to a gain correction step S2200 in FIG. 5.

(2-3) The control device 231 calculates a "guide position-estimated amount of meandering" that is an estimated value of the amount of meandering of the aluminum sheet 1 at the guide position of the meander control system 200, on the basis of the second feedforward model (corrected second feedforward model) that uses the second gain corrected on the basis of the error calculated in the operation (2-1), and the amount of meandering of the aluminum sheet 1 detected by the second edge sensor 222 (detected value from the second edge sensor 222). The operation (2-3) corresponds to a guide position-estimated meander amount calculation step S2300 shown in FIG. 5.

(2-4) The control device 231 calculates an amount of cancel-out movement on the basis of the "guide position-estimated amount of meandering" calculated in the operation (2-3), and a pre-set "relation between the amount of meandering of the aluminum sheet 1 at the guide position of the meander control system 200 and the feedforward-side amount of cancel-out movement that is the amount of movement of the guide roller 210 for cancelling out the feedforward-side amount of meandering". The operation (2-4) corresponds to a feedforward-side cancel-out movement amount calculation step S2400 shown in FIG. 5.

(2-5) The control device 231 calculates a feedback-side amount of cancel-out movement on the basis of the detected value from the third edge sensor 223, and a pre-set "relation between the amount of meandering of the aluminum sheet 1 at the third detection position and the feedback-side amount of cancel-out movement that is the amount of movement of the guide roller 210 for cancelling out the amount of meandering at the third detection position". The operation (2-5) corresponds to a feedback-side cancel-out movement amount calculation step S2500 shown in FIG. 5.

(2-6) The control device 231 calculates the sum of the feedforward-side amount of cancel-out movement calculated in the operation (2-4) and the feedback-side amount of cancel-out movement calculated in the operation (2-5), and sets the calculated sum as the "amount of cancel-out movement". The operation (2-6) corresponds to a cancel-out movement amount calculation step S2600 shown in FIG. 5.

(2-7) The control device 231 sends to the guide roller 210 a command signal for causing the guide roller 210 to move by the amount of cancel-out movement calculated in the operation (2-6). The operation (2-7) corresponds to the command signal sending step S2700 shown in FIG. 5.

As a result of the foregoing operations (2-1) to (2-7), the guide roller 210 alters the conveying direction of the aluminum sheet 1 on the basis of the command signal from the control device 231.

As described above, the meander control system 200 includes: the guide roller 210 that is disposed on an intermediate portion of the conveying path of the aluminum sheet 1, and that alters the conveying direction of the aluminum sheet 1 by moving in contact with the aluminum sheet 1 that is conveyed along the conveying path; the first edge sensor 221 that is disposed at the first detection position that is at the upstream side of the guide roller 210 along the conveying path, and that detects the amount of meandering of the aluminum sheet 1 at the first detection position; the second edge sensor 222 that is disposed at the second detection position between the first edge sensor 221 and the guide roller 210 on the conveying path, and that detects the amount of meandering of the aluminum sheet 1 at the second detection position; the third edge sensor 223 that is disposed at the third detection position downstream of the guide roller 210 along the conveying path, and that detects the amount of meandering of the aluminum sheet 1 at the third detection position; and the control device 231 that calculates errors ($\Delta T$ and $\Delta K$) contained in the first gain ($K_{S1S2}(t_m)$) of the first feedforward model in which the amount of meandering of the aluminum sheet 1 at the second detection position is estimated on the basis of the amount of meandering of the aluminum sheet 1 at the first detection position, on the basis of the detected value from the first edge sensor 221 and the detected value from the second edge sensor 222, and corrects, by the errors ($\Delta T$ and $\Delta K$) calculated earlier, the second gain $K_{S2GR}(t_m)$ of the second feedforward model in which the amount of meandering of the aluminum sheet 1 at the guide position is estimated on the basis of the amount of meandering of the aluminum sheet 1 at the second detection position, and calculates the guide position-estimated amount of meandering $y_{GR}(t_m)$ that is an estimated value of the amount of meandering of the aluminum sheet 1 at the guide position on the basis of the second feedforward model that employs the second gain. $K_{S2GR}(t_m)$ corrected by the calculated errors ($\Delta T$ and $\Delta K$), and also on the basis of the detected value from the second edge sensor 222, and calculates the feedforward-side amount of cancel-out movement on the basis of the calculated guide position-estimated amount of meandering $y_{GR}(t_m)$, and the pre-set "relation between the amount of meandering of the aluminum sheet 1 at the guide position and the feedforward-side amount of cancel-out movement that is the amount of movement of the guide roller 210 for cancelling out the amount of meandering at the guide position", and calculates a feedback-side amount of cancel-out movement on the basis of the detected value from the third edge sensor 223, and the pre-set relation between the amount of meandering of the aluminum sheet 1 at the third detection position and the feedback-side amount of cancel-out movement that is the amount of movement of the guide roller 210 for cancelling out the amount of meandering at the third detection position, and calculates the sum of the feedforward-side amount of cancel-out movement and the feedback-side amount of cancel-out movement, and sets the calculated sum as the amount of cancel-out movement, and sends to the guide roller 210 a command signal for causing the guide roller 210 to move by the calculated amount of cancel-out movement. This construction has the following advantages. That is, the meander control system 200 sequentially calculates the influence of the change of the conveying condition of the aluminum sheet 1 on the conveying path (the friction force between the aluminum sheet 1 and the group of rollers constituting the conveying device 10) as the errors ($\Delta T$ and $\Delta K$) by substituting, in the first feedforward model, the amounts of meandering detected by the first edge sensor 221 and the second edge sensor 222 (the detected value from the first edge sensor 221 and the detected value from the second edge sensor 222) that are disposed at different positions (the first detection position and the second detection position) on the conveying path. Then, the meander control system 200 reflects the errors in the second feedforward model to calculate the feedforward-side amount of cancel-out movement of the guide roller 210. Therefore, it is possible to effectively restrain the meandering of the aluminum sheet 1 even in the case where the conveying condition changes moment by moment. Besides, the meander control system 200 calculates the feedback-side amount of cancel-out movement of the guide roller 210 on the basis of the amount of meandering detected by the third edge sensor 223 (the detected value from the third edge sensor 223), and sets the sum of the calculated feedforward-side amount of cancel-out movement and the calculated feedback-side amount of cancel-out movement as the amount of cancel-out movement of the guide roller 210. Therefore, a control factoring in not only the feedforward control but also the feedback control is obtained, so that it is possible to more effectively restrain the meandering of the aluminum sheet 1.

As described above, the second embodiment of the meander control method in accordance with the invention is a meander control method of controlling the amount of meandering of the aluminum sheet 1 conveyed along the conveying path, by using: the guide roller 210 that is disposed on an intermediate portion of the conveying path of the aluminum sheet 1, and that alters the conveying direction of the aluminum sheet 1 by moving in contact with the aluminum sheet 1 that is conveyed along the conveying path; the first edge sensor 221 that is disposed at the first detection position that is at the upstream side of the guide roller 210 along the conveying path, and that detects the amount of meandering of the aluminum sheet 1 at the first detection position; the second edge sensor 222 that is disposed at the second detection position between the first edge sensor 221 and the guide roller 210 on the conveying path, and that detects the amount of meandering of the aluminum sheet 1 at the second detection position; and the third edge sensor 223 that is disposed at the third detection position downstream of the guide roller 210 along the conveying path, and that detects the amount of meandering of the aluminum sheet 1 at the third detection position, the control method including: the error calculation step S2100 of calculating errors ($\Delta T$ and $\Delta K$) contained in the first gain ($K_{S1S2}(t_m)$) of the first feedforward model in which the amount of meandering of the aluminum sheet 1 at the second detection position is estimated on the basis of the amount of meandering of the aluminum sheet 1 at the first detection position, on the basis of the detected value from the first edge sensor 221 and the detected value from the second edge sensor 222; the gain correction step S2200 of correcting, by the errors ($\Delta T$ and $\Delta K$) calculated earlier, the second gain $K_{S2GR}(t_m)$ of the second feedforward model in which the amount of meandering of the aluminum sheet 1 at the guide position is estimated on the basis of the amount of meandering of the aluminum sheet 1 at the second detection position; the guide position-estimated meander amount calculation step S2300 of calculating the guide position-estimated amount of meandering $y_{GR}(t_m)$ that is an estimated value of the amount of meandering of the aluminum sheet 1 at the guide position on the basis of the second feedforward model that employs the second gain $K_{S2GR}(t_m)$ corrected by the calculated errors ($\Delta T$ and $\Delta K$), and also on the basis of the detected value from the second edge sensor 222; the feedforward-side cancel-out movement amount calculation step S2400 of calculating the feedforward-side amount of cancel-out movement on the basis of the calculated guide position-estimated amount of meandering $y_{GR}(t_m)$, and the pre-set "relation between the amount of meandering of the aluminum sheet 1 at the guide position and the feedforward-side amount of cancel-out movement that is the amount of movement of the guide roller 210 for cancelling out the amount of meandering at the guide position"; the feedback-side cancel-out movement amount calculation step S2500 of calculating a feedback-side amount of cancel-out movement on the basis of the detected value from the third edge sensor 223, and the pre-set relation between the amount of meandering of the aluminum sheet 1 at the third detection position and the feedback-side amount of cancel-out movement that is the amount of movement of the guide roller 210 for cancelling out the amount of meandering at the third detection position; the cancel-out movement amount calculation step S2600 of calculating the sum of the feedforward-side amount of cancel-out movement and the feedback-side amount of cancel-out movement, and setting the calculated sum as the amount of cancel-out movement; and the command signal sending step S2700 of sending to the guide roller 210 a command signal for causing the guide roller 210 to move by the calculated amount of cancel-out movement. This construction has the following advantages. That is, the second embodiment of the meander control method of the invention calculates the influence of the change of the conveying condition of the aluminum sheet 1 on the conveying path (the friction force between the aluminum sheet 1 and the group of rollers constituting the conveying device 10) as the errors ($\Delta T$ and $\Delta K$) by substituting, in the first feedforward model, the amounts of meandering detected by the first edge sensor 221 and the second edge sensor 222 (the detected value from the first edge sensor 221 and the detected value from the second edge sensor 222) that are disposed at different positions (the first detection position and the second detection position) along the conveying path. Then, the second embodiment of the meander control method reflects the errors in the second feedforward model to calculate the feedforward-side amount of cancel-out movement of the guide roller 210. Therefore, it is possible to effectively restrain the meandering of the aluminum sheet 1 even in the case where the conveying condition changes moment by moment. Besides, the second embodiment of the meander control method calculates the feedback-side amount of cancel-out movement of the guide roller 210 on the basis of the amount of meandering detected by the third edge sensor 223 (the detected value from the third edge sensor 223), and sets the sum of the calculated feedforward-side amount of cancel-out movement and the calculated feedback-side amount of cancel-out movement as the amount of cancel-out movement of the guide roller 210. Therefore, a control factoring in not only the feedforward control but also the feedback control is obtained, so that it is possible to more effectively restrain the meandering of the aluminum sheet 1.

In this embodiment, after the feedforward-side cancel-out movement amount calculation step S2400 is performed, the feedback-side cancel-out movement amount calculation step S2500 is performed. However, the invention is not limited so. For example, the feedforward-side cancel-out movement amount calculation step and the feedback-side cancel-out movement amount calculation step may be concurrently performed. Or, it is also permissible to perform the feedback-side cancel-out movement amount calculation step prior to the feedforward-side cancel-out movement amount calculation step.

Figure 6:
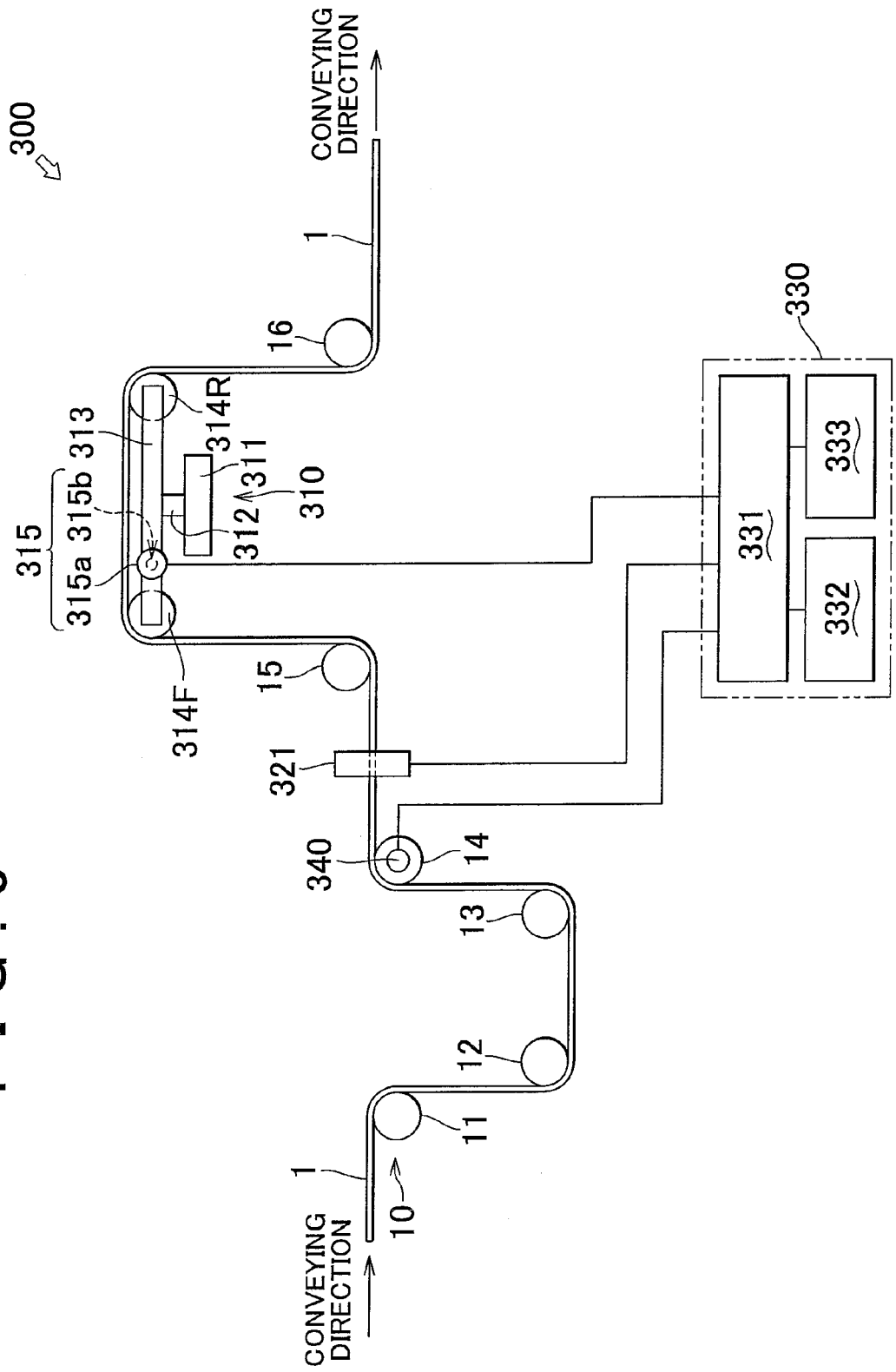
FIG. 6 is a diagram showing a third embodiment of the meander control system in accordance with the invention.
Figure 7:
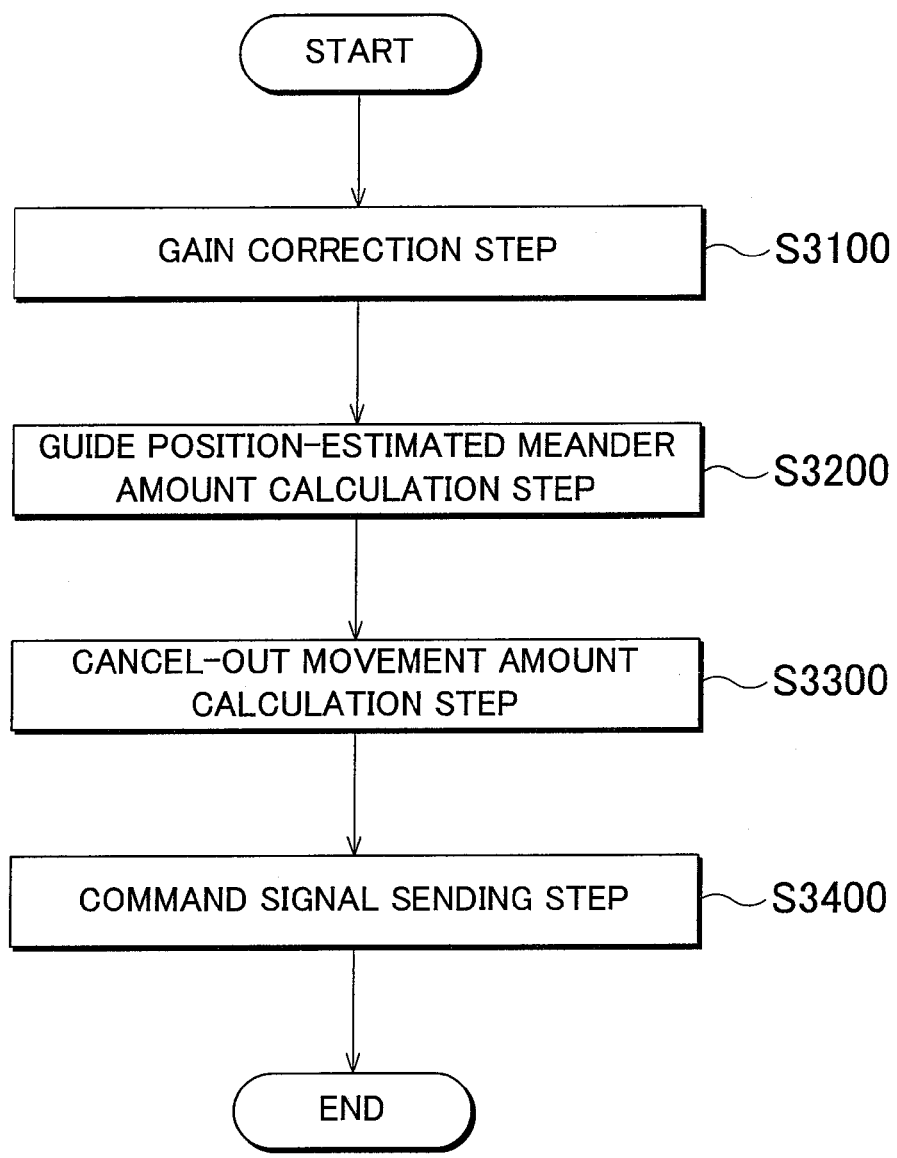
FIG. 7 is a flowchart showing a third embodiment of the meander control method in accordance with the invention.

Hereinafter, a meander control system 300 that is a third embodiment of the meander control system in accordance with the invention will be described with reference to FIG. 6 and FIG. 7. As shown in FIG. 6, the meander control system 300 controls the meandering of an aluminum sheet 1 that is conveyed by a conveyance device 10. The meander control system 300 mainly includes a guide roller 310, an edge sensor 321, a rotary encoder 340, and a control unit 330. Incidentally, the restraint (meander control) of the meandering of the aluminum sheet 1 by the meander control system 300 corresponds to a third embodiment of the meander control method in accordance with the invention. Then guide roller 310 mainly includes a base 311, a turning shaft 312, a turning frame 313, a front roller 314F, a rear roller 314R, and a hydraulic cylinder 315. The hydraulic cylinder 315 includes a cylinder main part 315*a*, and a cylinder rod 315*b*. A basic construction of the guide roller 310 is substantially the same as that of the guide roller 110 shown in FIG. 1, and a detailed description thereof is omitted.

The edge sensor 321 is an embodiment of a meander amount sensor in the invention, and is a sensor that detects the amount of meandering of the aluminum sheet 1. The edge sensor 321 is disposed at a "detection position" that is at the upstream side of the guide roller 310 along the conveying path of the aluminum sheet 1. In this embodiment, the "detection position" is set at a position between a roller 14 and a roller 15 of the conveyance device 10.

The rotary encoder 340 is an embodiment of a velocity sensor in accordance with the invention, and is a device that detects the conveying velocity of the aluminum sheet 1 that is conveyed along the conveying path. The rotary encoder 340 in this embodiment is provided on the roller 14, and detects the number of rotations of the roller 14. Since the roller 14 is in contact with the aluminum sheet 1 that is conveyed along the conveying path, the number of rotations of the roller 14 is proportional to the conveying velocity of the aluminum sheet 1 (in a situation where there is no occurrence of slip between the roller 14 and the aluminum sheet 1). Therefore, it is possible to detect the conveying velocity of the aluminum sheet 1 by detecting the number of rotations of the roller 14.

The control unit 330 includes a control device 331, an input device 332, and a display device 333.

The control device 331 is an embodiment of a control device in accordance with the invention. The control device 331 is able to store various programs and the like, and to expand these programs and the like, and to perform predetermined computations following these programs and the like, and to store results of the computations and the like, and to output the results of the computations and the like to an external device.

The control device 331 may be constructed substantially of a CPU, a ROM, a RAM, an HDD, etc. that are interconnected by a bus, or may also be constructed of a chip of LSI, or the like. The control device 331 in embodiment is a dedicated device, but may also be realized by a commercially available device, such as a personal computer, a work station, etc., that appropriately stores programs and the like.

The control device 331 is connected to the edge sensor 321. The control device 331 is able to acquire the amount of meandering of the aluminum sheet 1 at the detection position which is detected by the edge sensor 321, that is, is able to acquire the "detected value of the amount of meandering of the aluminum sheet 1 at the detection position". The control device 331 is connected to the rotary encoder 340. The control device 331 is able to acquire the number of rotations of the roller 14 which is detected by the rotary encoder 340, and therefore to acquire the conveying velocity of the aluminum sheet 1. Although in this embodiment, the conveying velocity of the aluminum sheet 1 is detected by the rotary encoder 340 that is provided on the roller 14 of the conveyance device 10, this construction does not limit the invention. For example, a rotary encoder for controlling the rotation speed of a motor that drives a driving roller (not shown) of the conveyance device may be utilized as a velocity sensor in accordance with the invention. It is also permissible to directly detect the conveying velocity of a sheet-like object in another manner.

The control device 331 is connected to the hydraulic cylinder 315 of the guide roller 310 (more strictly speaking, a switching valve provided on an oil passageway for supplying the working oil to the hydraulic cylinder 315). The control device 331 is able to send a command signal to the hydraulic cylinder 315. The hydraulic cylinder 315 elongates or contracts in accordance with the command signal sent from the control device 331.

Basic constructions of the input device 332 and the display device 333 are substantially the same as those of the input device 132 and the display device 133 shown in FIG. 1, and detailed descriptions thereof are omitted.

Hereinafter, a meander control method for the aluminum sheet 1 that is performed by the meander control system 300 will be described with reference to FIG. 7.

The meander control method for the aluminum sheet 1 performed by the meander control system 300 includes a series of operations (3-1) to (3-5) as shown below which the control device 331 performs. Incidentally, the amount of movement of the guide roller 310 in the embodiment substantially corresponds to the amount of elongation/contract of the hydraulic cylinder 315, and therefore corresponds to the amount of turn (turning angle) of a combined unit of the turning frame 313, the front roller 314F, and the rear roller 314R.

(3-1) The control device 331, on the basis of the detected value from the rotary encoder 340, corrects the time constant contained in the gain of a feedforward model in which the amount of meandering of the aluminum sheet 1 at the guide position (the position at which the aluminum sheet 1 contacts the guide roller 310) is estimated on the basis of the amount of meandering of the aluminum sheet 1 at the detection position. The operation (3-1) corresponds to a gain correction step S3100 shown in FIG. 7.

The feedforward model of the meander control system 300 is expressed by the following mathematical expression 7 using the amount of meandering $y_{GR}(t_m)$ of the aluminum sheet 1 at the guide position at time $t_m$, the amount of meandering $y_{GR}(t_{m-1})$ of the aluminum sheet 1 at the guide position at time $t_{m-1}$ that is earlier than time $t_m$ by a period $\Delta t$ in which the edge sensor 321 repeats the detection of the amount of meandering of the aluminum sheet 1, the amount of meandering $y_S(t_m)$ of the aluminum sheet 1 at the detection position at time $t_m$, and the time constant $T_{SGR}(t_m)$ at time $t_m$.

MATHEMATICAL EXPRESSION 7

$$y_{GR}(t_m) = y_{GR}(t_{m-1}) + \frac{\Delta t}{T_{SGR}(t_m) + \Delta t} \cdot y_S(t_m)$$
$$= y_{GR}(t_{m-1}) + K_{SGR}(t_m) \cdot y_S(t_m)$$

The time constant $T_{SGR}(t_m)$ in the mathematical expression 7 is expressed by the following mathematical expression 8 using the distance $L_{SGR}$ from the detection position to the guide position along the conveying path, and the detected value from the rotary encoder 340 at time $t_m$, that is, the detected value $V(t_m)$ from the conveying velocity at time $t_m$.

$$T_{SGR}(t_m) = \frac{L_{SGR}}{V(t_m)} \quad \text{MATHEMATICAL EXPRESSION 8}$$

The control device 331 calculates the time constant $T_{SGR}(t_m)$ at time $t_m$ by substituting the value detected by the rotary encoder 340 at time $t_m$, that is, the value detected by the conveying velocity at time $t_m$, in the mathematical expression 8. Besides, the control device 331 calculates a corrected gain $K_{SGR}(t_m)$ at time $t_m$, by substituting the calculated time constant $T_{SGR}(t_m)$ in the mathematical expression 7.

(3-2) The control device 331 calculates the guide position-estimated amount of meandering that is an estimated value of the amount of meandering of the aluminum sheet 1 at the guide position on the basis of the feedforward model that employs the corrected gain, and the detected value from the edge sensor 321. The operation (3-2) corresponds to a guide position-estimated meander amount calculation step S3200 shown in FIG. 7. More specifically, the control device 331 calculates the guide position-estimated amount of meandering $y_{GR}(t_m)$ at time $t_m$ by substituting the gains $K_{SGR}(t_1)$, $K_{SGR}(t_2)$, ... $K_{SGR}(t_m)$ calculated every period $\Delta t$, and the detected values $y_S(t_1), y_S(t_2), \ldots y_S(t_m)$ detected by the edge sensor 321 every period $\Delta t$, in the following mathematical expression 9 obtained by rewriting the mathematical expression 8.

$$y_{GR}(t_m) = y_{GR0} + \{K_{SGR}(t_1) \cdot y_S(t_1) + K_{SGR}(t_2) \cdot y_S(t_2) + \ldots + K_{SGR}(t_m) \cdot y_S(t_m)\} \text{ MATHEMATICAL EXPRESSION 9}$$

In this expression, $y_{GR0}$ is an initial value of the amount of meandering of the aluminum sheet 1 at the guide position of the meander control system 300, and is usually set at $y_{GR0}=0$.

(3-3) The control device 331 calculates the amount of cancel-out movement on the basis of the calculated guide position-estimated amount of meandering, and a pre-set "relation between the amount of meandering of the aluminum sheet 1 at the guide position and the amount of cancel-out movement that is the amount of movement of the guide roller 310 for cancelling out the amount of meandering at the guide position". The operation (3-3) corresponds to a cancel-out movement amount calculation step S3300 shown in FIG. 7.

(3-4) The control device 331 sends to the guide roller 310 a command signal for causing the guide roller 310 to move by the calculated amount of cancel-out movement. The operation (3-4) corresponds to a command signal sending step S3400 shown in FIG. 7.

As a result of the foregoing operations (3-1) to (3-4), the guide roller 310 alters the conveying direction of the aluminum sheet 1 on the basis of the command signal from the control device 331.

As described above, the meander control system 300 includes: the guide roller 310 that is disposed on an intermediate portion of the conveying path of the aluminum sheet 1, and that alters the conveying direction of the aluminum sheet 1 by moving in contact with the aluminum sheet 1 that is conveyed along the conveying path; the edge sensor 321 that is disposed at the detection position that is at the upstream side of the guide roller 310 along the conveying path, and that detects the amount of meandering of the aluminum sheet 1 at the detection position; the rotary encoder 340 that detects the conveying velocity of the aluminum sheet 1 that is conveyed along the conveying path; and the control device 331 that corrects the time constant contained in the gain of the feedforward model in which the amount of meandering of the aluminum sheet 1 at the guide position is estimated on the basis of the amount of meandering of the aluminum sheet 1 at the detection position, on the basis of the detected value from the rotary encoder 340, and calculates the guide position-estimated amount of meandering that is an estimated value of the amount of meandering of the aluminum sheet 1 at the guide position on the basis of the feedforward model that employs the corrected gain, and the detected value from the edge sensor 321, and calculates the amount of cancel-out movement on the basis of the calculated guide position-estimated amount of meandering, and the pre-set relation between the amount of meandering of the aluminum sheet 1 at the guide position and the amount of cancel-out movement that is the amount of movement of the guide roller 310 for cancelling out the amount of meandering at the guide position", and sends to the guide roller 310 a command signal for causing the guide roller 310 to move by the calculated amount of cancel-out movement. This construction has the following advantages. That is, the meander control system 300 serially corrects the gain of the feedforward model according to the change of the conveying velocity of the aluminum sheet 1, and calculates the amount of meandering of the aluminum sheet 1 at the guide position through the use of the corrected gain. Therefore, it is possible to accurately estimate the amount of meandering of the aluminum sheet 1 at the guide position even in the case where there are changes in the conveying conditions, in particular, a change in the conveying velocity. Thus, it is also possible to effectively restrain the meandering of the aluminum sheet 1.

Besides, the feedforward model of the meander control system 300 is expressed by the mathematical expression 7 using the amount of meandering $y_{GR}(t_m)$ of the aluminum sheet 1 at the guide position at time $t_m$, the amount of meandering $y_{GR}(t_{m-1})$ of the aluminum sheet 1 at the guide position at time $t_{m-1}$ that is earlier than time $t_m$ by a period $\Delta t$ in which the edge sensor 321 repeats the detection of the amount of meandering of the aluminum sheet 1, the amount of meandering $y_S(t_m)$ of the aluminum sheet 1 at the detection position at time $t_m$, and the time constant $T_{SGR}(t_m)$ at time $t_m$. Accordingly, the control device 331 of the meander control system 300 calculates the time constant $T_{SGR}(t_m)$ by substituting in the mathematical expression 8 the distance $L_{SGR}$ from the detection position to the guide position along the conveying path, and the detected value $V(t_m)$ from the rotary encoder 340 at time $t_m$, and calculates a gain $K_{SGR}(t_m)$ at time $t_m$ by substituting the calculated time constant $T_{SGR}(t_m)$ and the period $\Delta t$ in the mathematical expression 7, and calculates the amount of meandering $y_{GR}(t_m)$ of the aluminum sheet 1 at the guide position at time $t_m$, by substituting in the mathematical expression 9 the gains $K_{SGR}(t_1), K_{SGR}(t_2), \ldots K_{SGR}(t_m)$ of the edge sensor 321 detected every period $\Delta t$, and the detected values $y_S(t_1), y_S(t_2), \ldots y_S(t_m)$ from the edge sensor 321 detected every period $\Delta t$. Due to construction, even in the case where the conveying condition changes, and particularly, the conveying velocity changes, it is possible to accurately estimate the amount of meandering of the aluminum sheet 1 at the guide position, and thus it is possible to effectively restrain the meandering of the aluminum sheet 1.

As described above, the third embodiment of the meander control method in accordance with the invention is a meander control method that controls the amount of meandering of the aluminum sheet 1 conveyed along the conveying path, by using: the guide roller 310 that is disposed on an intermediate portion of the conveying path of the aluminum sheet 1, and that alters the conveying direction of the aluminum sheet 1 by moving in contact with the aluminum sheet 1 that is conveyed along the conveying path; the edge sensor 321 that is disposed at the detection position that is at the upstream side of the guide roller 310 along the conveying path, and that detects the amount of meandering of the aluminum sheet 1 at the detection position; and the rotary encoder 340 that detects the conveying velocity of the aluminum sheet 1 that is conveyed along the conveying path, the meander control method including: the gain correction step S3100 of correcting the time constant contained in the gain of the feedforward model in which the amount of meandering of the aluminum sheet 1 at the guide position at which the aluminum sheet 1 contacts the guide roller 310 is estimated on the basis of the amount of meandering of the aluminum sheet 1 at the detection position, on the basis of the detected value from the rotary encoder 340; the guide position-estimated meander amount calculation step S3200 of calculating the guide position-estimated amount of meandering that is an estimated value of the amount of meandering of the aluminum sheet 1 at the guide position on the basis of the feedforward model that employs the corrected gain, and the detected value from the edge sensor 321; the cancel-out movement amount calculation step S3300 of calculating the amount of cancel-out movement on the basis of the calculated guide position-estimated amount of meandering, and the pre-set relation between the amount of meandering of the aluminum sheet 1 at the guide position and the amount of cancel-out movement that is the amount of movement of the guide roller 310 for cancelling out the amount of meandering at the guide position; and the command signal sending step S3400 of sending to the guide roller 310 a command signal for causing the guide roller 310 to move by the calculated amount of cancel-out movement. This construction has the following advantages. That is, this control method serially corrects the gain of the feedforward model according to the change in the conveying velocity of the aluminum sheet 1, and calculates the amount of meandering of the aluminum sheet 1 at the guide position by using the corrected gain. Therefore, even in the case where the conveying condition changes and, in particular, the conveying velocity changes, it is possible to accurately estimate the amount of meandering of the aluminum sheet 1 at the guide position, and thus it is possible to effectively restrain the meandering of the aluminum sheet 1.

Besides, the feedforward model in the third embodiment of the meander control method in accordance with the invention is expressed by the mathematical expression 7 using the amount of meandering $y_{GR}(t_m)$ of the aluminum sheet 1 at the guide position at time $t_m$, the amount of meandering $y_{GR}(t_{m-1})$ of the aluminum sheet 1 at the guide position at time $t_{m-1}$ that is earlier than time $t_m$ by a period $\Delta t$ in which the edge sensor 321 repeats the detection of the amount of meandering of the aluminum sheet 1, the amount of meandering $y_S(t_m)$ of the aluminum sheet 1 at the detection position at time $t_m$, and the time constant $T_{SGR}(t_m)$ at time $t_m$. In the gain correction step S3100, the time constant $T_{SGR}(t_m)$ is calculated by substituting in the mathematical expression 8 the distance $L_{SGR}$ from the detection position to the guide position along the conveying path and the detected value $V(t_m)$ from the rotary encoder 340 at time $t_m$, and the gain $K_{SGR}(t_m)$ at time $t_m$ is calculated by substituting the calculated time constant $T_{SGR}(t_m)$ and the period $\Delta t$ in the mathematical expression 7. Then, in the guide position-estimated meander amount calculation step S3200, the amount of meandering $y_{GR}(t_m)$ of the aluminum sheet 1 at the guide position at time $t_m$ is calculated by substituting in the mathematical expression 9 the gains $K_{SGR}(t_1), K_{SGR}(t_2), \ldots K_{SGR}(t_m)$ calculated every period $\Delta t$, and the detected values $y_S(t_1), y_S(t_2), \ldots y_S(t_m)$ detected by the edge sensor 321 every period $\Delta t$. Due to this construction, even in the case where the conveying condition changes and, in particular, the conveying velocity changes, it is possible to accurately estimate the amount of meandering of the aluminum sheet 1 at the guide position, and thus it is possible to effectively restrain the meandering of the aluminum sheet 1.

Although in the foregoing meander control system 300, the meander amount sensor is disposed at an upstream side of the guide roller 310 along the conveying path, and only the feedforward control is performed, the invention is not limited to this construction. For example, a sensor that detects the amount of meandering is provided at a position that is at the downstream side of the guide roller 310, and a feedback control based on the detected value of the sensor may be performed as well as the feedforward control.

Although in the meander control system 300, the operations (3-1) to (3-4) are always performed, the invention is not limited to this construction. For example, it is also permissible to adopt a construction in which when the conveyance device changes the conveying velocity of the aluminum sheet 1, the operations (3-1) to (3-4) are performed, and when the conveying velocity is kept constant, the value of the gain is fixed at "1", and when the conveyance velocity is zero (when the conveyor apparatus is stopped), the value of the gain is fixed to "0".)

Figure 8:
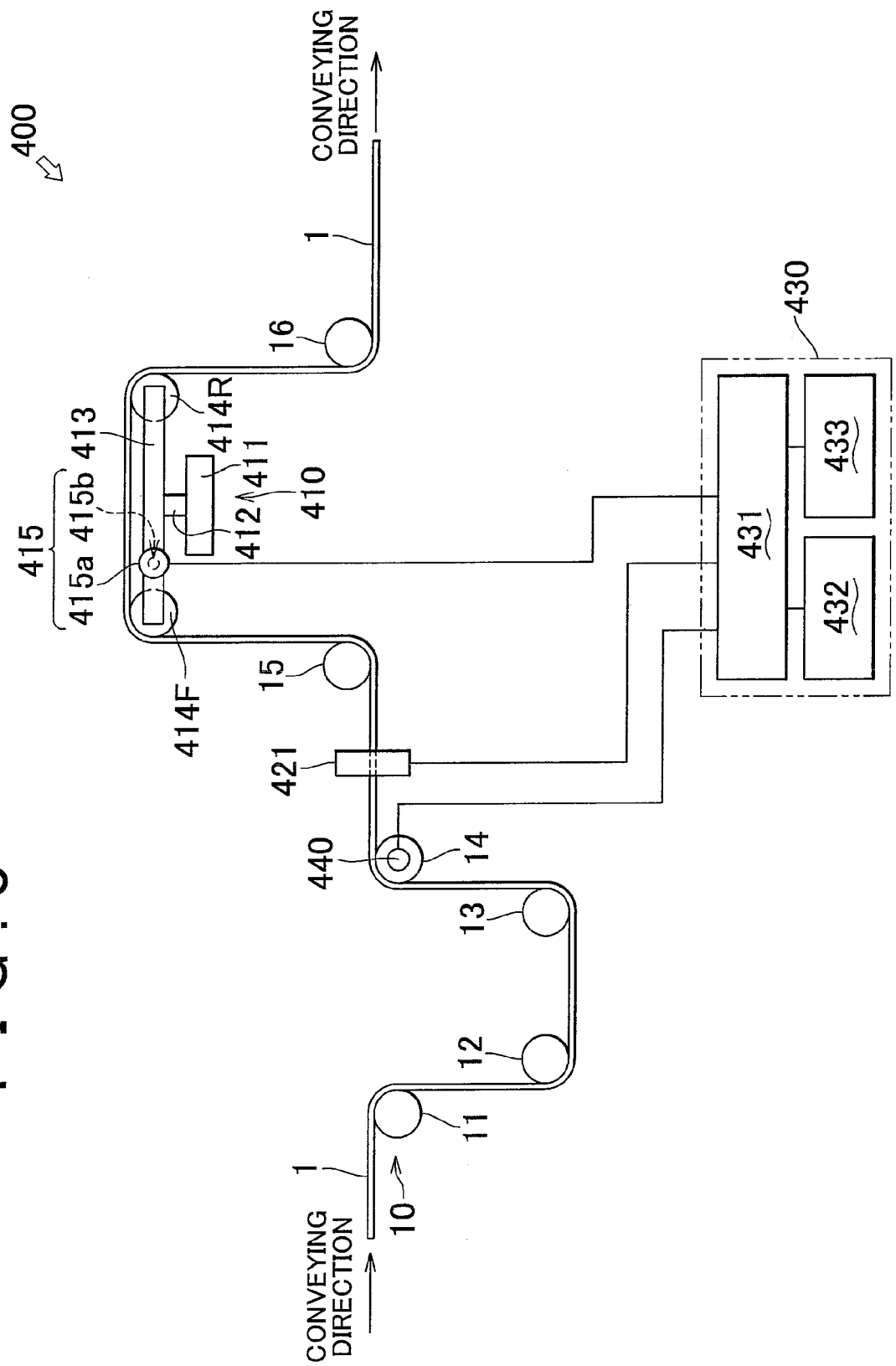
FIG. 8 is a diagram showing a fourth embodiment of the meander control system in accordance with the invention.

Hereinafter, a meander control system 400 that is a fourth embodiment of the meander control system in accordance with the invention will be described with reference to FIG. 8 to FIGS. 10A and 10B. As shown in FIG. 8, the meander control system 400 controls the meandering of an aluminum sheet 1 that is conveyed by a conveyance device 10. The meander control system 400 mainly includes a guide roller 410, an edge sensor 421, a rotary encoder 440, and a control unit 430. Incidentally, the restraint (meander control) of the meandering of the aluminum sheet 1 by the meander control system 400 corresponds to a fourth embodiment of the meander control method in accordance with the invention. Then guide roller 410 mainly includes a base 411, a turning shaft 412, a turning frame 413, a front roller 414F, a rear roller 414R, and a hydraulic cylinder 415. The hydraulic cylinder 415 includes a cylinder main part 415a, and a cylinder rod 415b. Basic constructions of the guide roller 410, the edge sensor 421 and the rotary encoder 440 are substantially the same as those of the guide roller 310, the edge sensor 321 and the rotary encoder 340 shown in FIG. 6, and detailed descriptions thereof are omitted.

The control unit 430 includes a control device 431, an input device 432, and a display device 433.

The control device 431 is an embodiment of a control device in accordance with the invention. The control device 431 is able to store various programs and the like, and to expand these programs and the like, and to perform predetermined computations following these programs and the like, and to store results of the computations and the like, and to output the results of the computations and the like to an external device.

The control device 431 may be constructed substantially of a CPU, a ROM, a RAM, an HDD, etc. that are interconnected by a bus, or may also be constructed of a chip of LSI, or the like. The control device 431 in embodiment is a dedicated device, but may also be realized by a commercially available device, such as a personal computer, a work station, etc., that appropriately stores programs and the like.

The control device 431 is connected to an edge sensor 421. The control device 431 is able to acquire the amount of meandering of the aluminum sheet 1 at the detection position which is detected by the edge sensor 421, that is, is able to acquire the "detected value of the amount of meandering of the aluminum sheet 1 at the detection position". The control device 431 is connected to the rotary encoder 440. The control device 431 is able to acquire the number of rotations of the roller 14 which is detected by the rotary encoder 440, and therefore to acquire the conveying velocity of the aluminum sheet 1.

The control device 431 is connected to the hydraulic cylinder 415 of the guide roller 410 (more strictly speaking, a switching valve provided on an oil passageway for supplying the working oil of the hydraulic cylinder 415). The control device 431 is able to send a command signal to the hydraulic cylinder 415. The hydraulic cylinder 415 elongates or contracts in accordance with the command signal sent from the control device 431.

Basic constructions of the input device 432 and the display device 433 are substantially the same as those of the input device 332 and the display device 333 shown in FIG. 6, and detailed descriptions thereof are omitted.

Hereinafter, a meander control method for the aluminum sheet 1 that is performed by the meander control system 400 will be described with reference to FIG. 9 and FIGS. 10A and 10B.

The meander control method for the aluminum sheet 1 performed by the meander control system 400 includes a series of operations (4-1) to (4-5) as shown below which the control device 431 performs. Incidentally, the amount of movement of the guide roller 410 in the embodiment substantially corresponds to the amount of elongation/contract of the hydraulic cylinder 415, and therefore corresponds to the amount of turn (turning angle) of a combined unit of the turning frame 413, the front roller 414F, and the rear roller 414R.

(4-1) The control device 431, on the basis of the detected value from the rotary encoder 440, corrects the time constant contained in the gain of a feedforward model in which the amount of meandering of the aluminum sheet 1 at the guide position (the position at which the aluminum sheet 1 contacts the guide roller 410) is estimated on the basis of the amount of meandering of the aluminum sheet 1 at the detection position. The operation (4-1) corresponds to a gain correction step S4100 shown in FIG. 9.

Figure 10A:
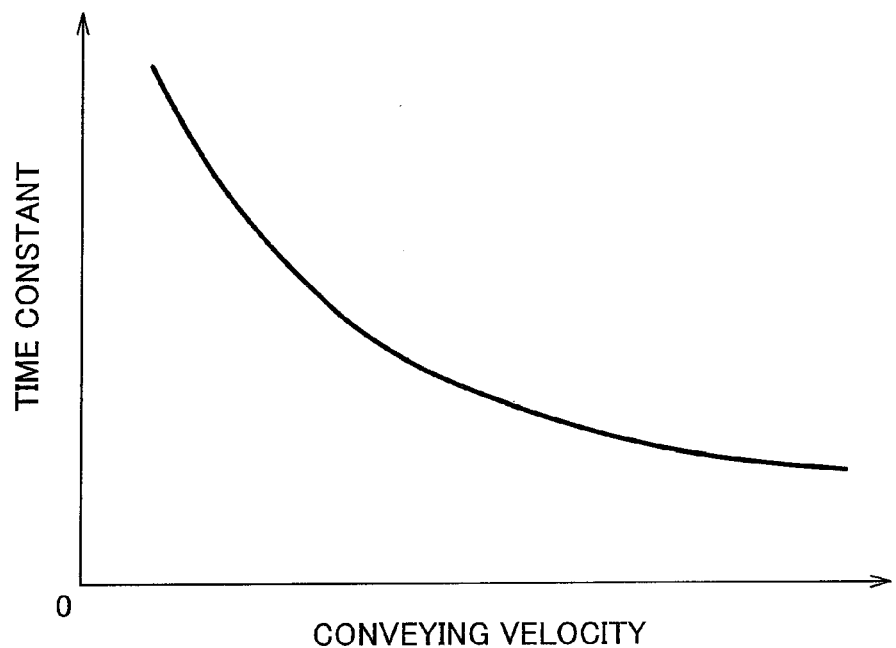
FIG. 10A is a diagram showing a relation between the conveying velocity and the time constant.
Figure 10B:
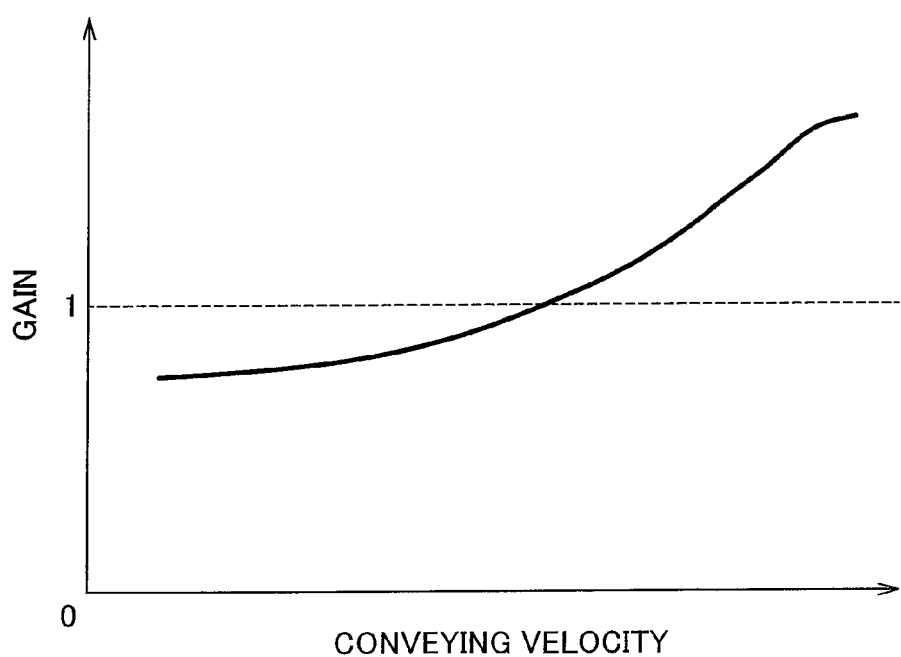
FIG. 10B is a diagram showing a relation between the conveying velocity and the gain.

More specifically, in this embodiment, a relational expression between the conveying velocity of the aluminum sheet 1 and the time constant as shown in FIG. 10A is found beforehand through experiments or the like, and a relational expression between the conveying velocity of the aluminum sheet 1 and the gain as shown in FIG. 10B is found beforehand by substituting the time constant calculated through the relational expression for $T_{SGR}(t_m)$ in the mathematical expression 7. Then, the control device 431 calculates the gain $K_{SGR}(t_m)$ at time $t_m$ by substituting the detected value from the rotary encoder 440 (the detected value of the conveying velocity of the aluminum sheet 1) $V(t_m)$ at time $t_m$ in the relational expression between the conveying velocity of the aluminum sheet 1 and the gain shown in FIG. 10B.

(4-2) The control device 431 calculates the guide position-estimated amount of meandering that is an estimated value of the amount of meandering of the aluminum sheet 1 at the guide position on the basis of the feedforward model that employs the corrected gain, and the detected value from the edge sensor 421. The operation (4-2) corresponds to a guide position-estimated meander amount calculation step S4200 shown in FIG. 9. More specifically, the control device 431 calculates the guide position-estimated amount of meandering $y_{GR}(t_m)$ at time $t_m$ by substituting the gains $K_{SGR}(t_1)$, $K_{SGR}(t_2)$, ... $K_{SGR}(t_m)$ calculated every period $\Delta t$, and the detected values $y_S(t_1)$, $y_S(t_2)$, ... $y_S(t_m)$ detected by the edge sensor 421 every period $\Delta t$, in the mathematical expression 9.

(4-3) The control device 431 calculates the amount of cancel-out movement on the basis of the calculated guide position-estimated amount of meandering, and a pre-set "relation between the amount of meandering of the aluminum sheet 1 at the guide position and the amount of cancel-out movement that is the amount of movement of the guide roller 410 for cancelling out the amount of meandering at the guide position". The operation (4-3) corresponds to a cancel-out movement amount calculation step S4300 shown in FIG. 9.

(4-4) The control device 431 sends to the guide roller 410 a command signal for causing the guide roller 410 to move by the calculated amount of cancel-out movement. The operation (4-4) corresponds to a command signal sending step S4400 shown in FIG. 9.

As a result of the operations (4-1) to (4-4), the guide roller 410 alters the conveying direction of the aluminum sheet 1 on the basis of the command signal from the control device 431.

As described above, the meander control system 400 includes: the guide roller 410 that is disposed on an intermediate portion of the conveying path of the aluminum sheet 1, and that alters the conveying direction of the aluminum sheet 1 by moving in contact with the aluminum sheet 1 that is conveyed along the conveying path; the edge sensor 421 that is disposed at the detection position that is at the upstream side of the guide roller 410 along the conveying path, and that detects the amount of meandering of the aluminum sheet 1 at the detection position; the rotary encoder 440 that detects the conveying velocity of the aluminum sheet 1 that is conveyed along the conveying path; and the control device 431 that corrects the time constant contained in the gain of the feedforward model in which the amount of meandering of the aluminum sheet 1 at the guide position is estimated on the basis of the amount of meandering of the aluminum sheet 1 at the detection position, on the basis of the detected value from the rotary encoder 440, and calculates the guide position-estimated amount of meandering that is an estimated value of the amount of meandering of the aluminum sheet 1 at the guide position on the basis of the feedforward model that employs the corrected gain, and the detected value from the edge sensor 421, and calculates the amount of cancel-out movement on the basis of the calculated guide position-estimated amount of meandering, and the pre-set relation between the amount of meandering of the aluminum sheet 1 at the guide position and the amount of cancel-out movement that is the amount of movement of the guide roller 410 for cancelling out the amount of meandering at the guide position", and sends to the guide roller 410 a command signal for causing the guide roller 410 to move by the calculated amount of cancel-out movement. The feedforward model of the meander control system 400 is expressed by the mathematical expression 7. Accordingly, the control device 431 calculates the gain $K_{SGR}(t_m)$ at time $t_m$ by substituting the detected value $V(t_m)$ from the rotary encoder 440 at time $t_m$ in the pre-set relational expression between the conveying velocity of the aluminum sheet 1 and the gain of the feedforward model of the meander control system 400 (see FIG. 10B), and calculates the amount of meandering $y_{GR}(t_m)$ of the aluminum sheet 1 at the guide position at time $t_m$ by substituting in the mathematical expression 9 the gains $K_{SGR}(t_1)$, $K_{SGR}(t_2)$, ... $K_{SGR}(t_m)$ calculated every period $\Delta t$, and the detected values $y_S(t_1)$, $y_S(t_2)$, ... $y_S(t_m)$ detected by the edge sensor 421 every period $\Delta t$. This construction has the following advantages. That is, the meander control system 400 serially corrects the gain of the feedforward model according to the change in the conveying velocity of the aluminum sheet 1, and calculates the amount of meandering of the aluminum sheet 1 at the guide position through the use of the corrected gain. Therefore, even in the case where the conveying velocity changes in a situation where the time constant is not inversely proportional to the conveying velocity, it is possible to serially correct the gain accurately on the basis of the relation between the conveying velocity and the gain which is obtained beforehand through experiments or the like. Therefore, it is possible to accurately estimate the amount of meandering of the aluminum sheet 1 at the guide position, and thus it is possible to effectively restrain the meandering of the aluminum sheet 1.

As described above, the fourth embodiment of the meander control method in accordance with the invention is a meander control method that controls the amount of meandering of the aluminum sheet 1 conveyed along the conveying path, by using: the guide roller 410 that is disposed on an intermediate portion of the conveying path of the aluminum sheet 1, and that alters the conveying direction of the aluminum sheet 1 by moving in contact with the aluminum sheet 1 that is conveyed along the conveying path; the edge sensor 421 that is disposed at the detection position that is at the upstream side of the guide roller 410 along the conveying path, and that detects the amount of meandering of the aluminum sheet 1 at the detection position; and the rotary encoder 440 that detects the conveying velocity of the aluminum sheet 1 that is conveyed along the conveying path, the meander control method including: the gain correction step S4100 of correcting the time constant contained in the gain of the feedforward model in which the amount of meandering of the aluminum sheet 1 at the guide position is estimated on the basis of the amount of meandering of the aluminum sheet 1 at the detection position, on the basis of the detected value from the rotary encoder 440; the guide position-estimated meander amount calculation step S4200 of calculating the guide position-estimated amount of meandering that is an estimated value of the amount of meandering of the aluminum sheet 1 at the guide position on the basis of the feedforward model that employs the corrected gain, and the detected value from the edge sensor 421; the cancel-out movement amount calculation step S4300 of calculating the amount of cancel-out movement on the basis of the calculated guide position-estimated amount of meandering, and the pre-set relation between the amount of meandering of the aluminum sheet 1 at the guide position and the amount of cancel-out movement that is the amount of movement of the guide roller 410 for cancelling out the amount of meandering at the guide position; and the command signal sending step S4400 of sending to the guide roller 410 a command signal for causing the guide roller 410 to move by the calculated amount of cancel-out movement. The feedforward model of the fourth embodiment of the meander control method in accordance with the invention is expressed by the mathematical expression 7. Accordingly, in the gain correction step S4100, the gain $K_{SGR}(t_m)$ at time $t_m$ is calculated by substituting the detected value $V(t_m)$ from the rotary encoder 440 at time $t_m$ in the pre-set relational expression between the conveying velocity of the aluminum sheet 1 and the gain of the feedforward model of the meander control system 400 (see FIG. 10B), and in the guide position-estimated meander amount calculation step S4200, the amount of meandering $y_{GR}(t_m)$ of the aluminum sheet 1 at the guide position at time $t_m$ is calculated by substituting in the mathematical expression 9 the gains $K_{SGR}(t_1)$, $K_{SGR}(t_2)$, ... $K_{SGR}(t_m)$ calculated every period $\Delta t$, and the detected values $y_S(t_1)$, $y_S(t_2)$, ... $y_S(t_m)$ detected by the edge sensor 421 every period $\Delta t$. This construction has the following advantages. That is, this control method serially corrects the gain of the feedforward model according to the change in the conveying velocity of the aluminum sheet 1, and calculates the amount of meandering of the aluminum sheet 1 at the guide position through the use of the corrected gain. Therefore, even in the case where the conveying velocity changes in a situation where the time constant is not inversely proportional to the conveying velocity, it is possible to serially correct the gain accurately on the basis of the relation between the conveying velocity and the gain which is obtained beforehand through experiments or the like. Therefore, it is possible to accurately estimate the amount of meandering of the aluminum sheet 1 at the guide position, and thus it is possible to effectively restrain the meandering of the aluminum sheet 1.

Figure 11:
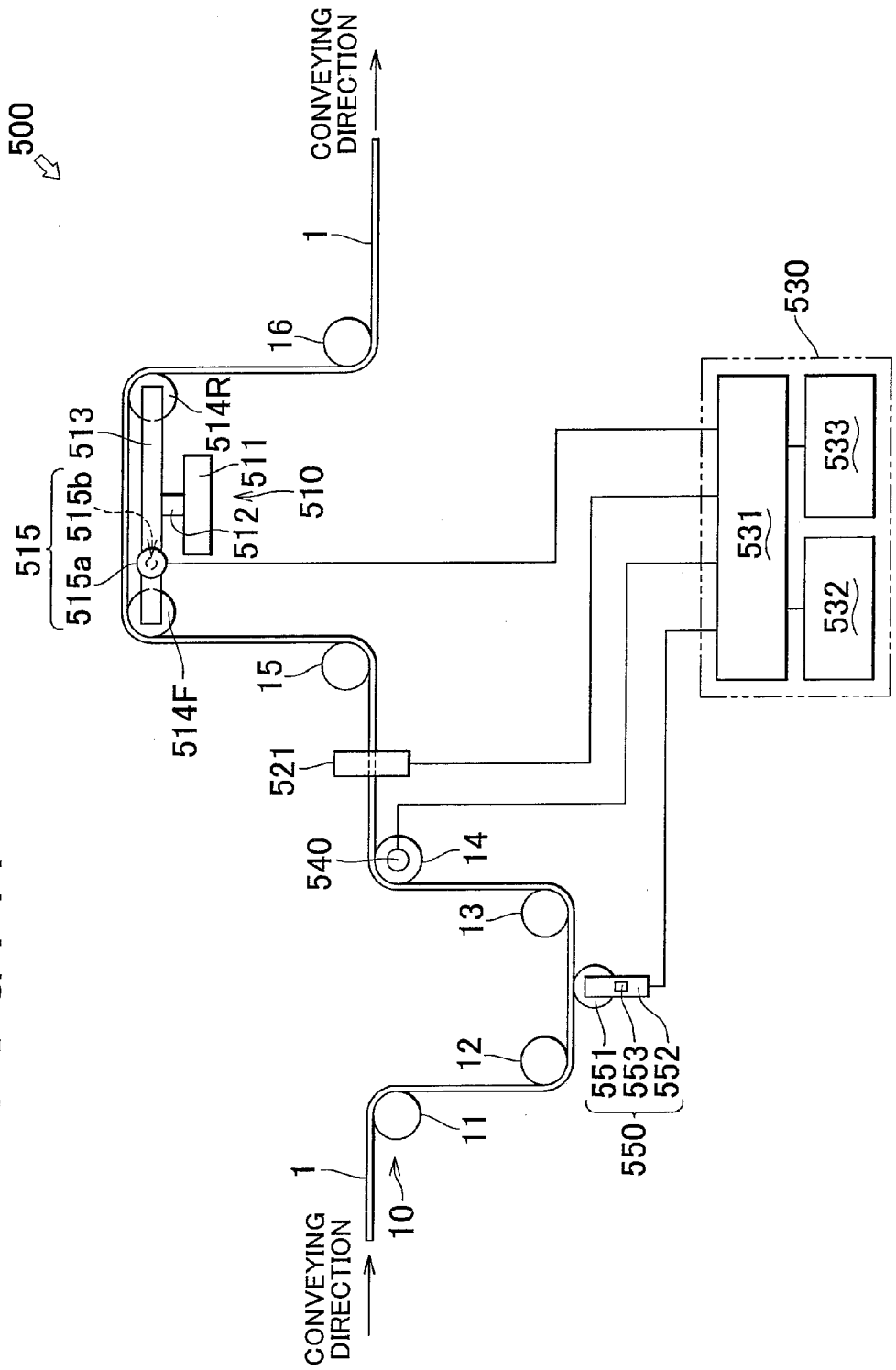
FIG. 11 is a diagram showing a fifth embodiment of the meander control system in accordance with the invention.

Hereinafter, a meander control system 500 that is a fifth embodiment of the meander control system in accordance with the invention will be described with reference to FIG. 11 to FIGS. 13A and 13B. As shown in FIG. 11, the meander control system 500 controls the meandering of an aluminum sheet 1 that is conveyed by a conveyance device 10. The meander control system 500 mainly includes a guide roller 510, an edge sensor 521, a rotary encoder 540, a tension sensor 550, and a control unit 530. Incidentally, the restraint (meander control) of the meandering of the aluminum sheet 1 by the meander control system 500 corresponds to a fifth embodiment of the meander control method in accordance with the invention. Then guide roller 510 mainly includes a base 511, a turning shaft 512, a turning frame 513, a front roller 514F, a rear roller 514R, and a hydraulic cylinder 515.

The hydraulic cylinder 515 includes a cylinder main part 515a, and a cylinder rod 515b. Basic constructions of the guide roller 510, the edge sensor 521 and the rotary encoder 540 are substantially the same as those of the guide roller 310, the edge sensor 321 and the rotary encoder 340 shown in FIG. 6, and detailed descriptions thereof are omitted.

The tension sensor 550 is an embodiment of a tension sensor in accordance with the invention, and is a sensor that detects the tension of the aluminum sheet 1 that is conveyed along the conveying path.

The tension sensor 550 mainly includes a tension roller 551, a shaft support member 552, and a strain gauge 553. The tension roller 551 is a roller that is capable of rotating in contact with the aluminum sheet 1 that is conveyed along the conveying path. In this embodiment, the tension roller 551 contacts the aluminum sheet 1 at a position between a roller 12 and a roller 13. The shaft support member 552 is a member that rotatably journals the tension roller 551. The strain gauge 553 is provided on the shaft support member 552, and is a sensor that detects the amount of strain of the shaft support member 552.

The force that the tension roller 551 receives from the aluminum sheet 1 is substantially proportional to the tension of the aluminum sheet 1 conveyed along the conveying path. The shaft support member 552 elastically deforms according to the force that the tension roller 551 receives from the aluminum sheet 1, and the strain gauge 553 outputs a signal that is commensurate with the amount of elastic deformation of the shaft support member 552. In this manner, the strain gauge 553 of the tension sensor 550 detects the amount of elastic deformation of the shaft support member 552, and therefore the tension of the aluminum sheet 1.

Although in the embodiment, the tension sensor 550 is disposed at an upstream side of the edge sensor 521 along the conveying path, this construction does not limit the invention. For example, the tension sensor may be disposed at a position between the meander amount sensor and the guide roller on the conveying path, and the tension sensor may also be disposed at the downstream side of the guide roller on the conveying path. However, from the viewpoint of accurate detection of the amount of meandering of the sheet-like object at the guide position, it is desirable to dispose the tension sensor at a position that is as close to the guide position as possible on the conveying path.

The control unit 530 includes a control device 531, an input device 532, and a display device 533.

The control device 531 is an embodiment of a control device in accordance with the invention. The control device 531 is able to store various programs and the like, and to expand these programs and the like, and to perform predetermined computations following these programs and the like, and to store results of the computations and the like, and to output the results of the computations and the like to an external device or the like.

The control device 531 may be constructed substantially of a CPU, a ROM, a RAM, an HDD, etc. that are interconnected by a bus, or may also be constructed of a chip of LSI, or the like. The control device 531 in this embodiment is a dedicated device, but may also be realized by a commercially available device, such as a personal computer, a work station, etc., that appropriately stores programs and the like.

The control device 531 is connected to an edge sensor 521. The control device 531 is able to acquire the amount of meandering of the aluminum sheet 1 at the detection position which is detected by the edge sensor 521, that is, is able to acquire the "detected value of the amount of meandering of the aluminum sheet 1 at the detection position". The control device 531 is connected to the rotary encoder 540. The control device 531 is able to acquire the number of rotations of the roller 14 which is detected by the rotary encoder 540, and therefore to acquire the conveying velocity of the aluminum sheet 1. The control device 531 is connected to the tension sensor 550 and, more particularly, to the strain gauge 553. The control device 531 is able to acquire the "tension of the aluminum sheet 1 conveyed along the conveying path" which is detected by the tension sensor 550.

The control device 531 is connected to the hydraulic cylinder 515 of the guide roller 510 (more strictly speaking, a switching valve provided on an oil passageway for supplying the working oil of the hydraulic cylinder 515). The control device 531 is able to send a command signal to the hydraulic cylinder 515. The hydraulic cylinder 515 elongates or contracts in accordance with the command signal sent from the control device 531.

Basic constructions of the input device 532 and the display device 533 are substantially the same as those of the input device 332 and the display device 333 shown in FIG. 6, and detailed descriptions thereof are omitted.

Figure 13A:
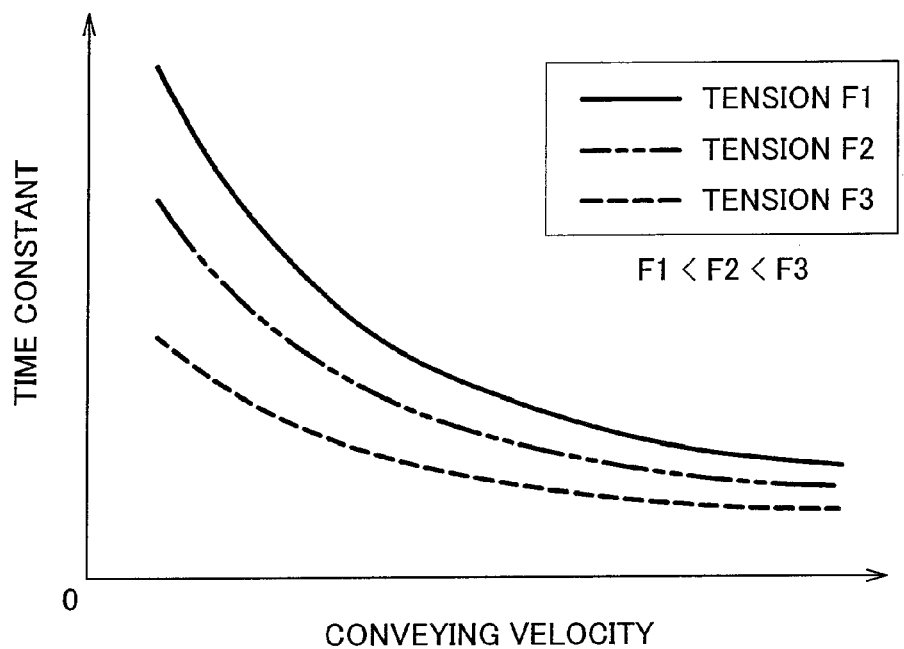
FIG. 13A is a diagram showing relations between the conveying velocity and the time constant separately for different tensions.
Figure 13B:
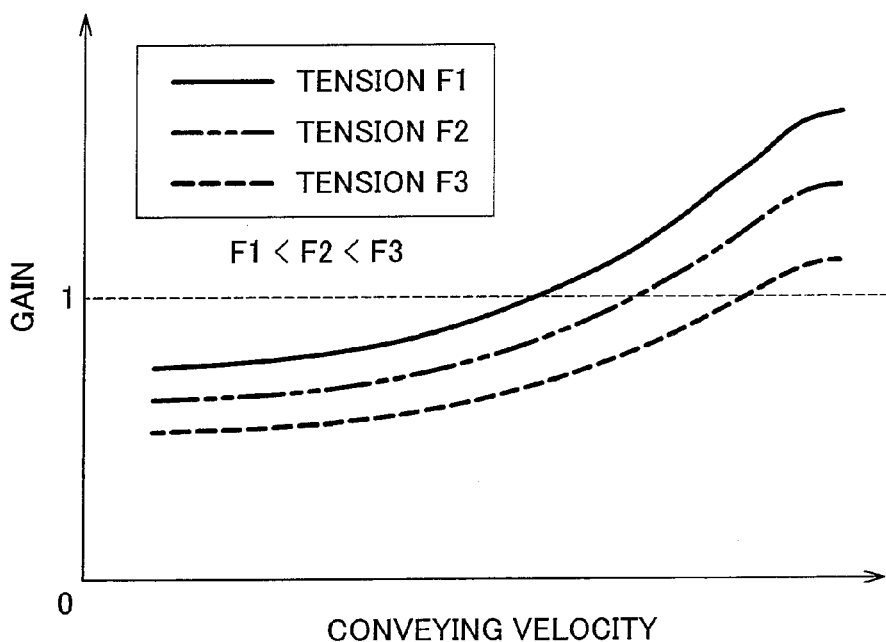
FIG. 13B is a diagram showing a relation between the conveying velocity and the gain.

Hereinafter, a meander control method for the aluminum sheet 1 that is performed by the meander control system 500 will be described with reference to FIG. 12 and FIGS. 13A and 13B.

The meander control method for the aluminum sheet 1 performed by the meander control system 500 includes a series of operations (5-1) to (5-5) as shown below which the control device 531 performs. Incidentally, the amount of movement of the guide roller 510 in the embodiment substantially corresponds to the amount of elongation/contract of the hydraulic cylinder 515, and therefore corresponds to the amount of turn (turning angle) of a combined unit of the turning frame 513, the front roller 514F, and the rear roller 514R.

(5-1) The control device 531, on the basis of the detected value from the rotary encoder 540 and the detected value from the tension sensor 550, corrects the time constant contained in the gain of a feedforward model in which the amount of meandering of the aluminum sheet 1 at the guide position (the position at which the aluminum sheet 1 contacts the guide roller 510) is estimated on the basis of the amount of meandering of the aluminum sheet 1 at the detection position. The operation (5-1) corresponds to a gain correction step S5100 shown in FIG. 12.

More specifically, in this embodiment, a "relational expression between the time constant and the conveying velocity of the aluminum sheet 1 when the tension of the aluminum sheet is F1 (a thick solid line in FIG. 13A)", a "relational expression between the time constant and the conveying velocity of the aluminum sheet 1 when the tension of the aluminum sheet is F2 (a thick dashed two-dotted line in FIG. 13A)", and a "relational expression between the time constant and the conveying velocity of the aluminum sheet 1 when the tension of the aluminum sheet is F3 (a thick dotted line in FIG. 13A)" are found beforehand through experiments or the like. Next, by substituting the time constants calculated through these relational expressions for the $T_{SGR}(t_m)$ in the mathematical expression 7, a "relational expression between the gain and the conveying velocity of the aluminum sheet 1 when the tension of the aluminum sheet is F1 (a thick solid line in FIG. 13B", a "relational expression between the gain and the conveying velocity of the aluminum sheet 1 when the tension of the aluminum sheet is F2 (a thick dashed two-dotted line in FIG. 13B)", and a "relational expression between the gain and the conveying velocity of the aluminum sheet 1 when the tension of the aluminum sheet is F3 (a thick dotted line in FIG. 13B)" are found beforehand. Then, the control device 531 calculates the gain $K_{SGR}(t_m)$ at time $t_m$ by substituting the detected value from the tension sensor 550 and the detected value from the rotary encoder 540 (the detected value of the conveying velocity of the aluminum sheet 1) $V(t_m)$ at time $t_m$ in the relational expression between the conveying velocity of the aluminum sheet 1 and the gain shown in FIG. 13B. For example, in the case where the detected value F from the tension sensor 550 is a value between the tension F1 and the tension F2 (F=F1+α×(F2−F1), 0≦α≦1), the control device 531 calculates $K_{SGR}(t_m)$ as a solution of the calculation expression $K_{SGR}(t_m)$=K1+α× (K2−K1) employing the gain K1 that is obtained by substituting $V(t_m)$ in the "relational expression between the gain and the conveying velocity of the aluminum sheet 1 when the tension of the aluminum sheet is F1", and the gain K2 that is obtained by substituting $V(t_m)$ in the "relational expression between the gain and the conveying velocity of the aluminum sheet 1 when the tension of the aluminum sheet is F2". Thus, the control device 531 calculates $K_{SGR}(t_m)$ as a linearly interpolated value using an appropriate one of the relational expressions between the gain and the conveying velocity of the aluminum sheet 1 with different tensions.

(5-2) The control device 531 calculates the guide position-estimated amount of meandering that is an estimated value of the amount of meandering of the aluminum sheet 1 at the guide position on the basis of the feedforward model that employs the corrected gain, and the detected value from the edge sensor 521. The operation (5-2) corresponds to a guide position-estimated meander amount calculation step S5200 shown in FIG. 12. More specifically, the control device 531 calculates the guide position-estimated amount of meandering $y_{GR}(t_m)$ at time $t_m$ by substituting the gains $K_{SGR}(t_1)$, $K_{SGR}(t_2)$, ... $K_{SGR}(t_m)$ calculated every period Δt, and the detected values $y_S(t_1)$, $y_S(t_2)$, ... $y_S(t_m)$ detected by the edge sensor 521 every period Δt, in the mathematical expression 9.

(5-3) The control device 531 calculates the amount of cancel-out movement on the basis of the calculated guide position-estimated amount of meandering, and a pre-set "relation between the amount of meandering of the aluminum sheet 1 at the guide position and the amount of cancel-out movement that is the amount of movement of the guide roller 510 for cancelling out the amount of meandering at the guide position". The operation (5-3) corresponds to a cancel-out movement amount calculation step S5300 shown in FIG. 12.

(5-4) The control device 531 sends to the guide roller 510 a command signal for causing the guide roller 510 to move by the calculated amount of cancel-out movement. The operation (5-4) corresponds to a command signal sending step S5400 shown in FIG. 12.

As a result of the operations (5-1) to (5-4), the guide roller 510 alters the conveying direction of the aluminum sheet 1 on the basis of the command signal from the control device 531.

As described above, the meander control system 500 includes: the guide roller 510 that is disposed on an intermediate portion of the conveying path of the aluminum sheet 1, and that alters the conveying direction of the aluminum sheet 1 by moving in contact with the aluminum sheet 1 that is conveyed along the conveying path; the edge sensor 521 that is disposed at the detection position that is at the upstream side of the guide roller 510 along the conveying path, and that detects the amount of meandering of the aluminum sheet 1 at the detection position; the rotary encoder 540 that detects the conveying velocity of the aluminum sheet 1 that is conveyed along the conveying path; the tension sensor 550 that detects the tension of the aluminum sheet 1 conveyed along the conveying path; and the control device 531 that corrects the time constant contained in the gain of the feedforward model in which the amount of meandering of the aluminum sheet 1 at the guide position is estimated on the basis of the amount of meandering of the aluminum sheet 1 at the detection position, on the basis of the detected value from the rotary encoder 540 and the detected value from the tension sensor 550, and calculates the guide position-estimated amount of meandering that is an estimated value of the amount of meandering of the aluminum sheet 1 at the guide position on the basis of the feedforward model that employs the corrected gain, and the detected value from the edge sensor 521, and calculates the amount of cancel-out movement on the basis of the calculated guide position-estimated amount of meandering, and the pre-set relation between the amount of meandering of the aluminum sheet 1 at the guide position and the amount of cancel-out movement that is the amount of movement of the guide roller 510 for cancelling out the amount of meandering at the guide position", and sends to the guide roller 510 a command signal for causing the guide roller 510 to move by the calculated amount of cancel-out movement. This construction has the following advantages. That is, the meander control system 500 serially corrects the gain of the feedforward model according to the changes in the tension and the conveying velocity of the aluminum sheet 1, and calculates the amount of meandering of the aluminum sheet 1 at the guide position through the use of the corrected gain. Therefore, even in a situation where there is a change in the conveying velocity and the tension of the aluminum sheet 1 changes even when the conveying velocity is fixed, it is possible to serially correct the gain accurately. Therefore, it is possible to accurately estimate the amount of meandering of the aluminum sheet 1 at the guide position, and thus it is possible to effectively restrain the meandering of the aluminum sheet 1.

The feedforward model of the meander control system 500 is expressed by the mathematical expression 7. Accordingly, the control device 531 calculates the gain $K_{SGR}(t_m)$ at time $t_m$ through linear interpolation using the gain calculated by substituting the detected value $V(t_m)$ from the rotary encoder 540 at time $t_m$ in the pre-set relational expression between the conveying velocity of the aluminum sheet 1 and the gain of the feedforward model of the meander control system 500 (see FIG. 13B) with respect to different tensions (tension F1, tension F2, and tension F3 in this embodiment), and calculates the amount of meandering $y_{GR}(t_m)$ of the aluminum sheet 1 at the guide position at time $t_m$ by substituting in the mathematical expression 9 the gains $K_{SGR}(t_1)$, $K_{SGR}(t_2)$, ... $K_{SGR}(t_m)$ calculated every period $\Delta t$, and the detected values $y_S(t_1)$, $y_S(t_2)$, ... $y_S(t_m)$ detected by the edge sensor 521 every period $\Delta t$. Due to this construction, even in the case where the tension and the conveying velocity of the aluminum sheet 1 vary, it is possible to accurately estimate the amount of meandering of the aluminum sheet 1 at the guide position. Thus it is possible to effectively restrain the meandering of the aluminum sheet 1.

As described above, the fifth embodiment of the meander control method in accordance with the invention is a meander control method that controls the amount of meandering of the aluminum sheet 1 conveyed along the conveying path, by using: the guide roller 510 that is disposed on an intermediate portion of the conveying path of the aluminum sheet 1, and that alters the conveying direction of the aluminum sheet 1 by moving in contact with the aluminum sheet 1 that is conveyed along the conveying path; the edge sensor 521 that is disposed at the detection position that is at the upstream side of the guide roller 510 along the conveying path, and that detects the amount of meandering of the aluminum sheet 1 at the detection position; the rotary encoder 540 that detects the conveying velocity of the aluminum sheet 1 that is conveyed along the conveying path; and the tension sensor 550 that detects the tension of the aluminum sheet 1 conveyed along the conveying path, the meander control method including: the gain correction step S5100 of correcting the time constant contained in the gain of the feedforward model in which the amount of meandering of the aluminum sheet 1 at the guide position is estimated on the basis of the amount of meandering of the aluminum sheet 1 at the detection position, on the basis of the detected value from the rotary encoder 540 and the detected value from the tension sensor 550; the guide position-estimated meander amount calculation step S5200 of calculating the guide position-estimated amount of meandering that is an estimated value of the amount of meandering of the aluminum sheet 1 at the guide position on the basis of the feedforward model that employs the corrected gain, and the detected value from the edge sensor 521; the cancel-out movement amount calculation step S5300 of calculating the amount of cancel-out movement on the basis of the calculated guide position-estimated amount of meandering, and the pre-set relation between the amount of meandering of the aluminum sheet 1 at the guide position and the amount of cancel-out movement that is the amount of movement of the guide roller 510 for cancelling out the amount of meandering at the guide position; and the command signal sending step S5400 of sending to the guide roller 510 a command signal for causing the guide roller 510 to move by the calculated amount of cancel-out movement. The feedforward model of the fifth embodiment of the meander control method in accordance with the invention is expressed by the mathematical expression 7. This construction has the following advantages. That is, the meander control system 500 serially corrects the gain of the feedforward model according to the changes in the tension and the conveying velocity of the aluminum sheet 1, and calculates the amount of meandering of the aluminum sheet 1 at the guide position through the use of the corrected gain. Therefore, even in a situation where there is a change in the conveying velocity and the tension of the aluminum sheet 1 changes even when the conveying velocity is fixed, it is possible to serially correct the gain accurately. Therefore it is possible to accurately estimate the amount of meandering of the aluminum sheet 1 at the guide position, and thus it is possible to effectively restrain the meandering of the aluminum sheet 1.

In the fifth embodiment of the meander control method in accordance with the invention, the feedforward model is expressed by the mathematical expression 7. In the gain correction step S5100, the gain $K_{SGR}(t_m)$ at time $t_m$ is calculated through linear interpolation using the gain calculated by substituting the detected value $V(t_m)$ from the rotary encoder 540 at time $t_m$ in the pre-set relational expression between the conveying velocity of the aluminum sheet 1 and the gain of the feedforward model of the meander control system 500 (see FIG. 13B) with respect to different tensions (tension F1, tension F2 and tension F3 in the embodiment). In the guide position-estimated meander amount calculation step S5200, the amount of meandering $y_{GR}(t_m)$ of the aluminum sheet 1 at the guide position at time $t_m$ is calculated by substituting in the mathematical expression 9 the gains $K_{SGR}(t_1)$, $K_{SGR}(t_2)$, ... $K_{SGR}(t_m)$ calculated every period $\Delta t$, and the detected values $y_S(t_1)$, $y_S(t_2)$, ... $y_S(t_m)$ detected by the edge sensor 521 every period $\Delta t$. Due to this construction, even in the case where the tension and the conveying velocity of the aluminum sheet 1 vary, it is possible to accurately estimate the amount of meandering of the aluminum sheet 1 at the guide position. Thus it is possible to effectively restrain the meandering of the aluminum sheet 1.

While the invention has been described with reference to an example embodiment thereof, it is to be understood that the invention is not limited to the example embodiment or constructions. To the contrary, the invention is intended to cover various modifications and equivalent arrangements. In addition, while the various elements of the example embodiment are shown in various combinations and configurations, which are example, other combinations and configurations, including more, less or only a single element, are also within the scope of the invention.

What is claimed is:

1. A meander control system comprising:
a guide roller that is disposed on an intermediate portion of a conveying path of a sheet-like object, and that alters conveying direction of the sheet-like object by moving in contact with the sheet-like object conveyed along the conveying path;
a first meander amount sensor which is disposed at a first detection position that is at an upstream side of the guide roller along the conveying path, and which detects amount of meandering of the sheet-like object at the first detection position;
a second meander amount sensor that is disposed at a second detection position between the first meander amount sensor and the guide roller on the conveying path, and that detects the amount of meandering of the sheet-like object at the second detection position; and
a control device that
calculates an error contained in a first gain of a first feedforward model in which the amount of meandering of the sheet-like object at the second detection position is estimated based on the amount of meandering of the sheet-like object at the first detection position, based on a detected value from the first meander amount sensor and a detected value from the second meander amount sensor, and
corrects by the error a second gain of a second feedforward model in which the amount of meandering of the sheet-like object at a guide position that is a position at which the sheet-like object contacts the guide roller is estimated based on the amount of meandering of the sheet-like object at the second detection position, and
calculates a guide position-estimated amount of meandering that is an estimated value of the amount of meandering of the sheet-like object at the guide position based on the second feedforward model that employs the second gain corrected by the error, and on the detected value from the second meander amount sensor, and
calculates an amount of cancel-out movement based on the guide position-estimated amount of meandering, and a pre-set relation between the amount of meandering of the sheet-like object at the guide position and the amount of cancel-out movement that is an amount of movement of the guide roller for cancelling out the amount of meandering at the guide position, and
sends to the guide roller a command signal for causing the guide roller to move by the amount of cancel-out movement calculated.

2. The meander control system according to claim 1, wherein:
the first feedforward model is expressed by mathematical expression 2 using the amount of meandering $y_{S2}(t_m)$ of the sheet-like object at the second detection position at time $t_m$, the amount of meandering $y_{S2}(t_{m-1})$ of the sheet-like object at the second detection position at time $t_{m-1}$ that is earlier than time $t_m$ by a period $\Delta t$ in which the first meander amount sensor and the second meander amount sensor repeat detection of the amount of meandering of the sheet-like object, the amount of meandering $y_{S1}(t_m)$ of the sheet-like object at the first detection position at time $t_m$, the time constant $T_{S1S2}$ calculated by substituting in mathematical expression 1 a distance $L_{S1S2}$ from the first detection position to the second detection position along the conveying path, and a conveying velocity V of the sheet-like object, an error $\Delta T$, and an error $\Delta K$;
the second feedforward model is expressed by mathematical expression 4 using the amount of meandering $y_{GR}(t_m)$ of the sheet-like object at the guide position at time $t_m$, the amount of meandering $y_{GR}(t_{m-1})$ of the sheet-like object at the guide position at time $T_{m-1}$, the amount of meandering $y_{S2}(t_m)$ of the sheet-like object at the second detection position at time $t_m$, a time constant $T_{S2GR}$ calculated by substituting in mathematical expression 3 a distance $L_{S2GR}$ from the second detection position to the guide position along the conveying path and the conveying velocity V of the sheet-like object, the error $\Delta T$, and the error $\Delta K$; and
the control device repeatedly performs, from time $t_1$ to time $t_m$, an operation of calculating a combination of the error $\Delta T$ and the error $\Delta K$ that minimizes a square sum A obtained by substituting in mathematical expression 5 the time constant $T_{S1S2}$, the period $\Delta t$, the detected values $y_{S1}(t_{a1}), y_{S1}(t_{a2}), \ldots Y_{S1}(t_{an})$ from the first meander amount sensor at times $t_{a1}, t_{a2}, \ldots t_{an}$ (n is an integer of 2 or greater) that are earlier than time $t_m$, and the detected values $y_{S2}(t_{a1}), y_{S2}(t_{a2}), \ldots y_{S2}(t_{an})$ from the second meander amount sensor at times $t_{a1}, t_{a2}, \ldots t_{an}$, as the combination of the error $\Delta T$ and the error $\Delta K$ at time $t_m$, and calculates the second gains $K_{S2GR}(t_1), K_{S2GR}(t_2), \ldots K_{S2GR}(t_m)$ that correspond to time $t_1$ to time $t_m$, respectively, based on the combinations of the error $\Delta T$ and the error $\Delta K$ that correspond to time $t_1$ to time $t_m$, respectively, and calculates the guide position-estimated amount of meandering $y_{GR}(t_m)$ at time $t_m$ by substituting in mathematical expression 6 the calculated second gains, and the detected values $Y_{S2}(t_1), y_{S2}(t_2), \ldots y_{S2}(tm)$ from the second meander amount sensor at time $t_1$ to time $t_m$:

MATHEMATICAL EXPRESSION 1

$$T_{S1S2} = \frac{L_{S1S2}}{V}$$

MATHEMATICAL EXPRESSION 2

$$y_{S2}(t_m) = y_{S2}(t_{m-1}) + \frac{T_{S1S2} + \Delta T}{T_{S1S2} + \Delta T + \Delta t} \cdot y_{S1}(t_m)$$
$$= y_{S2}(t_{m-1}) + K_{S1S2}(t_m) \cdot y_{S1}(t_m)$$

MATHEMATICAL EXPRESSION 3

$$T_{S2GR} = \frac{L_{S2GR}}{V}$$

MATHEMATICAL EXPRESSION 4

$$y_{GR}(t_m) = y_{GR}(t_{m-1}) + \frac{T_{S2GR} + \Delta T}{T_{S2GR} + \Delta T + \Delta t} \cdot y_{S2}(t_m)$$
$$= y_{GR}(t_{m-1}) + K_{S2GR}(t_m) \cdot y_{S2}(t_m)$$

MATHEMATICAL EXPRESSION 5

$$A = \sum_{t=t_{a1}}^{t_{an}} \left\{ y_{S2}(t) - \frac{(1+\Delta K) \cdot \Delta t}{T_{S1S2} + \Delta T} \cdot y_{S1}(t) \right\}^2 \quad t_{a1}, t_{a2}, \ldots t_{an} < t_m$$

MATHEMATICAL EXPRESSION 6

$$y_{GR}(t_m) =$$
$$y_{GR0} + \{K_{S2GR}(t_1) \cdot y_{S2}(t_1) + K_{S2GR}(t_2) \cdot y_{S2}(t_2) + \ldots + K_{S2GR}(t_m) \cdot y_{S2}(t_m)\}.$$

3. A meander control method of controlling amount of meander of a sheet object by using: a guide roller that is disposed on an intermediate portion of a conveying path of a sheet-like object, and that alters conveying direction of the sheet-like object by moving in contact with the sheet-like object conveyed along the conveying path; a first meander amount sensor which is disposed at a first detection position that is at an upstream side of the guide roller along the conveying path, and which detects amount of meandering of the sheet-like object at the first detection position; and a second meander amount sensor that is disposed at a second detection position between the first meander amount sensor and the guide roller on the conveying path, and that detects the amount of meandering of the sheet-like object at the second detection position, the meander amount control comprising:

an error calculation step of calculating an error contained in a first gain of a first feedforward model in which the amount of meandering of the sheet-like object at the second detection position is estimated based on the amount of meandering of the sheet-like object at the first detection position, based on a detected value from the first meander amount sensor and a detected value from the second meander amount sensor;

a gain correction step of correcting by the error a second gain of a second feedforward model in which the amount of meandering of the sheet-like object at a guide position that is a position at which the sheet-like object contacts the guide roller is estimated based on the amount of meandering of the sheet-like object at the second detection position;

a guide position-estimated meander amount calculation step of calculating a guide position-estimated amount of meandering that is an estimated value of the amount of meandering of the sheet-like object at the guide position based on the second feedforward model that employs the second gain corrected by the error, and on the detected value from the second meander amount sensor;

a cancel-out movement amount calculation step of calculating an amount of cancel-out movement based on the guide position-estimated amount of meandering, and a pre-set relation between the amount of meandering of the sheet-like object at the guide position and the amount of cancel-out movement that is an amount of movement of the guide roller for cancelling out the amount of meandering at the guide position; and a command signal sending step of sending to the guide roller a command signal for causing the guide roller to move by the amount of cancel-out movement calculated.

4. The meander control method according to claim 3, wherein:

the first feedforward model is expressed by mathematical expression 2 using the amount of meandering $y_{S2}(t_m)$ of the sheet-like object at the second detection position at time $t_m$, the amount of meandering $y_{S2}(t_{m-1})$ of the sheet-like object at the second detection position at time $t_{m-1}$ that is earlier than time $t_m$ by a period $\Delta t$ in which the first meander amount sensor and the second meander amount sensor repeat detection of the amount of meandering of the sheet-like object, the amount of meandering $y_{S1}(t_m)$ of the sheet-like object at the first detection position at time $t_m$, the time constant $T_{S1S2}$ calculated by substituting in mathematical expression 1 a distance $L_{S1S2}$ from the first detection position to the second detection position along the conveying path, and a conveying velocity V of the sheet-like object, an error $\Delta T$, and an error $\Delta K$;

the second feedforward model is expressed by mathematical expression 4 using the amount of meandering $y_{GR}(t_m)$ of the sheet-like object at the guide position at time $t_m$, the amount of meandering $y_{GR}(t_{m-1})$ of the sheet-like object at the guide position at time $t_{m-1}$, the amount of meandering $y_{S2}(t_m)$ of the sheet-like object at the second detection position at time $t_m$, a time constant $T_{S2GR}$ calculated by substituting in mathematical expression 3 a distance $L_{S2GR}$ from the second detection position to the guide position along the conveying path and the conveying velocity V of the sheet-like object, the error $\Delta T$, and the error $\Delta K$;

in the error calculation step, an operation of calculating a combination of the error $\Delta T$ and the error $\Delta K$ that minimizes a square sum A obtained by substituting in mathematical expression 5 the time constant $T_{S1S2}$, the period $\Delta t$, the detected values $y_{S1}(t_{a1}), y_{S1}(t_{a2}), \ldots Y_{S1}(t_{an})$ from the first meander amount sensor at times $t_{a1}, t_{a2}, \ldots t_{an}$ (n is an integer of 2 or greater) that are earlier than time $t_m$, and the detected values $y_{S2}(t_{a1}), y_{S2}(t_{a2}), \ldots y_{S2}(t_{an})$ from the second meander amount sensor at times $t_{a1}, t_{a2} \ldots t_{an}$ as the combination of the error $\Delta T$ and the error $\Delta K$ at time $t_m$ is repeatedly performed from time $t_1$ to time $t_m$;

in the gain correction step, the second gains $K_{S2GR}(t_1), K_{S2GR}(t_2), \ldots K_{S2GR}(t_m)$ that correspond to time $t_1$ to time $t_m$, respectively, based on the combinations of the error $\Delta T$ and the error $\Delta K$ that correspond to time $t_1$ to time $t_m$, respectively, is calculated; and in the guide position-estimated amount calculation step, the guide position-estimated amount of meandering $y_{GR}(t_m)$ at time $t_m$ is calculated by substituting in mathematical expression 6 the calculated second gains, and the detected values $y_{S2}(t_1), y_{S2}(t_2), \ldots Y_{S2}(t_m)$ from the second meander amount sensor at time $t_1$ to time $t_m$:

MATHEMATICAL EXPRESSION 1

$$T_{S1S2} = \frac{L_{S1S2}}{V}$$

MATHEMATICAL EXPRESSION 2

$$y_{S2}(t_m) = y_{S2}(t_{m-1}) + \frac{T_{S1S2} + \Delta T}{T_{S1S2} + \Delta T + \Delta t} \cdot y_{S1}(t_m)$$
$$= y_{S2}(t_{m-1}) + K_{S1S2}(t_m) \cdot y_{S1}(t_m)$$

MATHEMATICAL EXPRESSION 3

$$T_{S2GR} = \frac{L_{S2GR}}{V}$$

MATHEMATICAL EXPRESSION 4

$$y_{GR}(t_m) = y_{GR}(t_{m-1}) + \frac{T_{S2GR} + \Delta T}{T_{S2GR} + \Delta T + \Delta t} \cdot y_{S2}(t_m)$$
$$= y_{GR}(t_{m-1}) + K_{S2GR}(t_m) \cdot y_{S2}(t_m)$$

MATHEMATICAL EXPRESSION 5

$$A = \sum_{t=t_{a1}}^{t_{an}} \left\{ y_{S2}(t) - \frac{(1+\Delta K) \cdot \Delta t}{T_{S1S2} + \Delta T} \cdot y_{S1}(t) \right\}^2 \quad t_{a1}, t_{a2}, \ldots t_{an} < t_m$$

MATHEMATICAL EXPRESSION 6

$$y_{GR}(t_m) = y_{GR0} + \{K_{S2GR}(t_1) \cdot y_{S2}(t_1) + K_{S2GR}(t_2) \cdot y_{S2}(t_2) + \ldots + K_{S2GR}(t_m) \cdot y_{S2}(t_m)\}.$$

* * * * *

UNITED STATES PATENT AND TRADEMARK OFFICE
CERTIFICATE OF CORRECTION

PATENT NO.        : 8,038,148 B2                           Page 1 of 1
APPLICATION NO.   : 12/435520
DATED             : October 18, 2011
INVENTOR(S)       : Toshio Fuwa It is certified that error appears in the above-identified patent and that said Letters Patent is hereby corrected as shown below:

| Column | Line | |
|--------|------|---|
| 46 | 24 | Change "$Y_{s1}(t_{an})$" to --$y_{s1}(t_{an})$--. |
| 46 | 36 | Change "$Y_{s2}(t_1)$" to --$y_{s2}(t_1)$--. |
| 48 | 17 | Change "$Y_{s1}(t_{an})$" to --$y_{s1}(t_{an})$--. |
| 48 | 34 | Change "$Y_{s2}(t_m)$" to --$y_{s2}(t_m)$--. |

Signed and Sealed this
Fifth Day of June, 2012

David J. Kappos
*Director of the United States Patent and Trademark Office*